United States Patent
Cohn et al.

(10) Patent No.: US 11,910,916 B1
(45) Date of Patent: Feb. 27, 2024

(54) ARTICULATED SUPPORT ARRANGEMENT FOR MOBILE ELECTRONIC DEVICES AND THE LIKE

(71) Applicant: 1514 Tech, LLC., Huntingdon Valley, PA (US)

(72) Inventors: Robert J. Cohn, Dallas, PA (US); Michael M. Kalick, Ambler, PA (US); Stephen R. Bianco, Feasterville, PA (US); Ronald J. Trichon, Meadowbrook, PA (US)

(73) Assignee: 1514 Tech, LLC., Huntingdon Valley, PA (US)

( * ) Notice: Subject to any disclaimer, the term of this patent is extended or adjusted under 35 U.S.C. 154(b) by 0 days.

(21) Appl. No.: 18/090,984

(22) Filed: Dec. 29, 2022

(51) Int. Cl.
 *F16M 13/02* (2006.01)
 *A47B 23/02* (2006.01)
 *F16M 11/04* (2006.01)

(52) U.S. Cl.
 CPC ......... *A47B 23/025* (2013.01); *F16M 11/041* (2013.01); *F16M 13/02* (2013.01); *F16M 13/022* (2013.01); *F16M 2200/06* (2013.01)

(58) Field of Classification Search
 CPC ...... F16M 11/041; F16M 13/00; F16M 13/02; F16M 13/022; F16M 2200/06; A47B 23/025
 USPC ..................................................... 248/309.1
 See application file for complete search history.

(56) References Cited

U.S. PATENT DOCUMENTS

| | | | |
|---|---|---|---|
| 6,269,753 B1 | 8/2001 | Roddan | |
| 6,966,533 B1* | 11/2005 | Kalis | F16M 13/022 248/316.4 |
| 7,677,519 B2 | 3/2010 | Gauer | |
| 8,082,857 B2 | 12/2011 | George et al. | |
| 8,100,061 B2 | 1/2012 | Hookway et al. | |
| 8,544,161 B2* | 10/2013 | Carnevali | F16M 13/00 379/455 |
| 8,622,359 B2* | 1/2014 | Carnevali | F16M 13/022 248/316.1 |
| 9,133,982 B1* | 9/2015 | Valdez | F16M 13/022 |
| 9,664,214 B1* | 5/2017 | Gupta | G03B 17/561 |
| 10,259,400 B1* | 4/2019 | Song | B60R 11/0241 |
| 10,702,067 B2* | 7/2020 | Acevedo | F16M 11/14 |
| 10,823,329 B1* | 11/2020 | Dammermann | F16B 2/10 |
| D931,204 S * | 9/2021 | Liao | D13/108 |
| 11,421,814 B2 | 8/2022 | Affentranger | |
| 11,516,328 B2* | 11/2022 | Adelman | F16M 13/022 |
| 2007/0151489 A1 | 7/2007 | Byrne | |
| 2015/0055278 A1* | 2/2015 | Baschnagel | H05K 5/0204 361/679.01 |

(Continued)

*Primary Examiner* — Todd M Epps
(74) *Attorney, Agent, or Firm* — Wendy W. Koba

(57) ABSTRACT

A support fixture is disclosed that may be removably clamped to a bed rail (or any other support member) and includes a lower support arm attached to the removable clamp through a rotatable connector. An upper support arm is attached to a distal termination of the lower support arm via a pivot connector. The combination of the lower and upper arms is referred to at times as an articulated arm assembly. A device support member is coupled to the upper support arm via a multi-stage gimbal system, perhaps in combination with a quick-release connection (allowing for the device support component to be used as a stand-alone fixture). The device support member is particularly configured to support a computing device, a communication device, or the like.

17 Claims, 21 Drawing Sheets

(56) References Cited

U.S. PATENT DOCUMENTS

2016/0084432 A1 3/2016 Chuang

* cited by examiner

FIG. 9
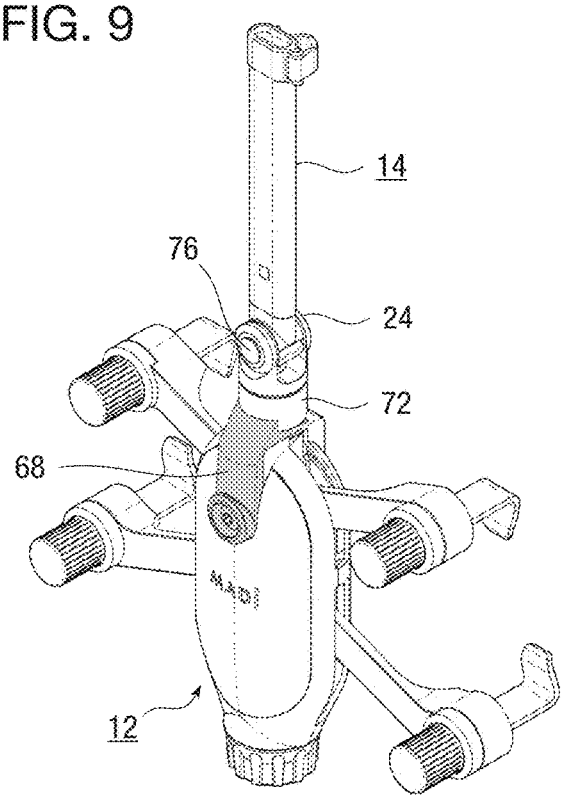
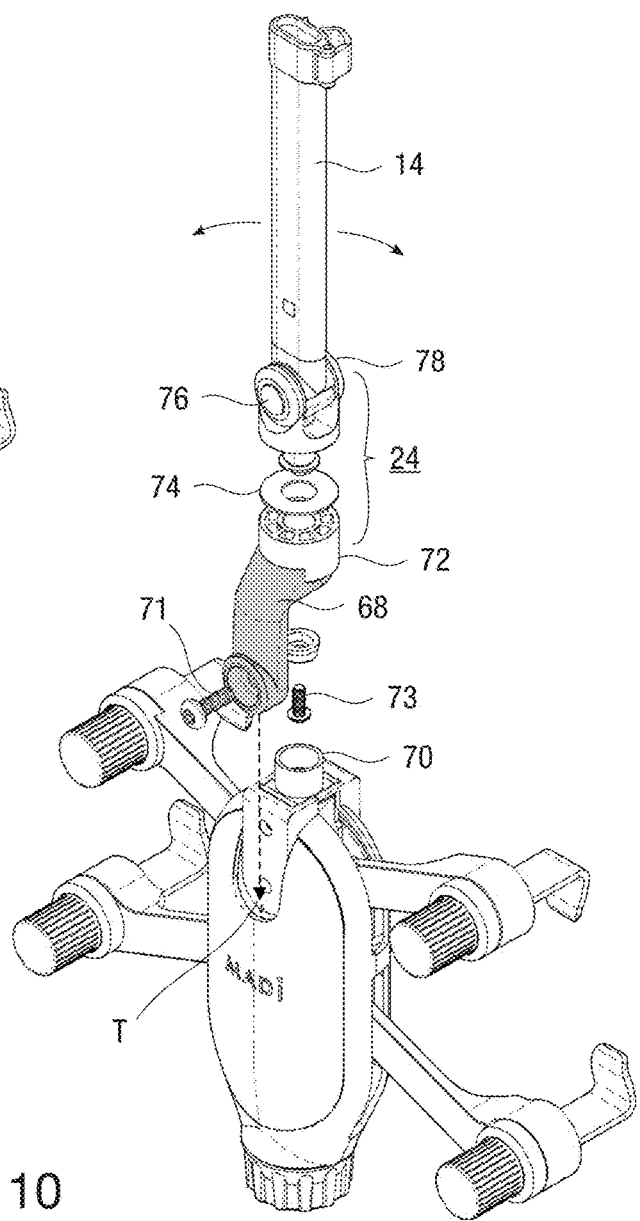
FIG. 10

ARTICULATED SUPPORT ARRANGEMENT FOR MOBILE ELECTRONIC DEVICES AND THE LIKE

TECHNICAL FIELD

The present invention relates to fixtures for supporting devices when the user is in a supine position and, more particularly, to an articulated support stand that may be attached to a bed rail or the like.

BACKGROUND OF THE INVENTION

Computers are used in many different surroundings, such as homes, schools, medical institutions and other types of businesses. There are times when computers and other electronic devices such as phones, tablets, etc. are used by an individual that is sitting in bed (or in a relatively supine position in bed). In some cases, it is difficult to find a comfortable position for performing computer-related tasks while also balancing a computer, laptop, tablet, etc. People with limited dexterity may find it difficult to use their devices while trying to maintain balance. Simply stated, there are ergonomic issues involved with people using their electronic devices in bed.

SUMMARY OF THE INVENTION

The needs remaining in the prior art are addressed by the present invention, which relates to fixtures for supporting devices when the user is in a supine position and, more particularly, to an articulated support stand that may be attached to a bed rail or the like.

In accordance with the present invention, a support fixture is provided that may be removably clamped to a bed rail (or any other support rail) and includes a lower support arm attached to the removable clamp through a rotatable connector. An upper support arm is attached to a distal termination of the lower support arm via a pivot connector. The combination of the lower and upper arms is referred to at times as an articulated arm assembly. A device support member is coupled to the upper support arm via a multi-stage gimbal system, perhaps in combination with a quick-release connection (allowing for the device support component to be used as a stand-alone fixture).

In various embodiments, the clamp may include pairs of rotatable scissor arms that grasp the inner and outer surfaces of a support rail. The clamp may further comprise a locking knob that is utilized to maintain the pairs of rotatable scissor arms in place once mounted onto the support rail.

Some embodiments may include a lower arm that is connected to the clamp through a fixture that allows for the lower arm to be foldable, extendable and rotatable. That is, the coupling between the clamp and the lower arm is configured to allow the lower arm to rotate and swing from a horizontal to vertical position (with respect to the support rail). The horizontal motion is preferable fully encompassing motion from −90 degrees to +90 degrees with respect to the vertical position.

A device holder component in various embodiments includes a pair of side grippers for holding, for example, an electronic device in place, particularly by engaging with opposing side edges of the electronic device (or any other object of the user's choice). At least one of the side grippers may be extendable so as to accommodate the use of relatively wide devices. The device holder may also include one or more fold-up dividers that are used to enable the single device holder to fixedly support multiple electronic devices (e.g., a tablet and a phone). For added flexibility, a quick release feature may be included in the connection between the device holder to the upper arm, allowing for the device holder to be dis-engaged from the remaining elements of the fixture in certain situations. The ability to completely remove the device holder from the other elements of the fixture allows for the device holder to become a device stand, for example, or used on a monitor arm mount (for example) via an industry standard type of bracket (e.g., a VESA plate).

An exemplary embodiment of the present invention may take the form of a support fixture for use with electronic devices, where the support fixture includes, a clamp, an articulated arm assembly, and a device support component. The clamp includes a pair of possibly spring-loaded scissor arms coupled together at a central pivot point, the crossing of the pair of scissor arms creating a set of four arm portions that pivot in a manner to grasp top and bottom surfaces of a support member. The clamp further comprises a locking mechanism including a locking knob and a drive screw fixed to an interior of the locking knob and having a locking nut disposed on the drive screw, where the locking knob is disposed such that the drive screw is positioned in the vertical direction below the pivot point, with the rotation of the locking knob causing the locking nut to move vertically along the drive screw toward the central pivot point, fixing the pair of scissor arms in place upon being positioned on the support member. The articulated arm assembly includes an arm assembly bracket (disposed over the clamp and including an opening disposed along the vertical axis of the clamp), a lower arm that includes a pivot joint member at a proximal termination for attaching the lower arm to the arm assembly bracket (the pivot joint member enabling the lower arm to rotate between vertical and horizontal positionings), and an upper arm coupled to a distal termination of the lower arm through a multi-position joint coupling, the upper arm further comprising a multi-stage gimbal system disposed at the distal termination thereof. The device support component is coupled to the upper arm through the multi-stage gimbal, enabling rotational and yaw movements with respect to the upper arm, the device support component having a main body deck and a pair of gripping arms disposed along opposite terminations thereof, the pair of gripping arms used for securing edges of an electronic device to the support fixture.

Another embodiment of the present invention is configured to comprise a clamp component including a pair of scissor arms coupled together at a central pivot point, the crossing of the pair of scissor arms creating a set of four arm portions that pivot in a manner to grasp top and bottom surfaces of the (typically horizontal) support member, and a locking mechanism including a locking knob and a drive screw fixed to an interior of the locking knob and having a locking nut disposed on the drive screw, wherein the locking knob is disposed such that the drive screw is positioned in the longitudinal direction below the pivot point with the rotation of the locking knob causing the locking nut to move longitudinally along the drive screw toward the central pivot point.

Yet another embodiment of the present invention may comprise an articulated arm assembly including a clamp, an arm assembly bracket disposed over the clamp and including an opening disposed along the vertical axis of the clamp, a lower arm, including a pivot joint member at a proximal termination for attaching the lower arm to the arm assembly bracket (the pivot joint member enabling the lower arm to rotate between vertical and horizontal positions, a typically horizontal position bringing the lower arm in proximity to the clamp as used in a stowed position), and an upper arm coupled to a distal termination of the lower arm through an upper arm pivot joint coupling.

A further embodiment of the present invention is directed to device holder component for use in supporting at least one communication device. In particular, the device holder component includes a main body deck, a pair of side grippers disposed along opposite terminations of the main body deck and used for securing edges of the at least one communication device to the device holder component, and an angled support bracket attached to a lower surface of the main body deck and positioned such that a computer keyboard may be disposed on the angled support bracket.

Other and further aspects and embodiments of the present invention will become apparent during the course of the following discussion and by reference to the accompanying drawings.

BRIEF DESCRIPTION OF THE DRAWINGS

Referring now to the drawings, where like numerals represent like parts in several views:

FIG. 9 contains a front isometric view of an attachment between the clamp and lower arm elements of the inventive support fixture;

FIG. 10 is an exploded view of the arrangement of FIG. 9;

FIG. 25(a) shows the configuration in a "joined" (closed) configuration, FIG. 25(b) illustrates the beginning of the quick release action; and FIG. 25(c) shows a further separation between the upper arm element and the device support component;

DETAILED DESCRIPTION

Figure 1:
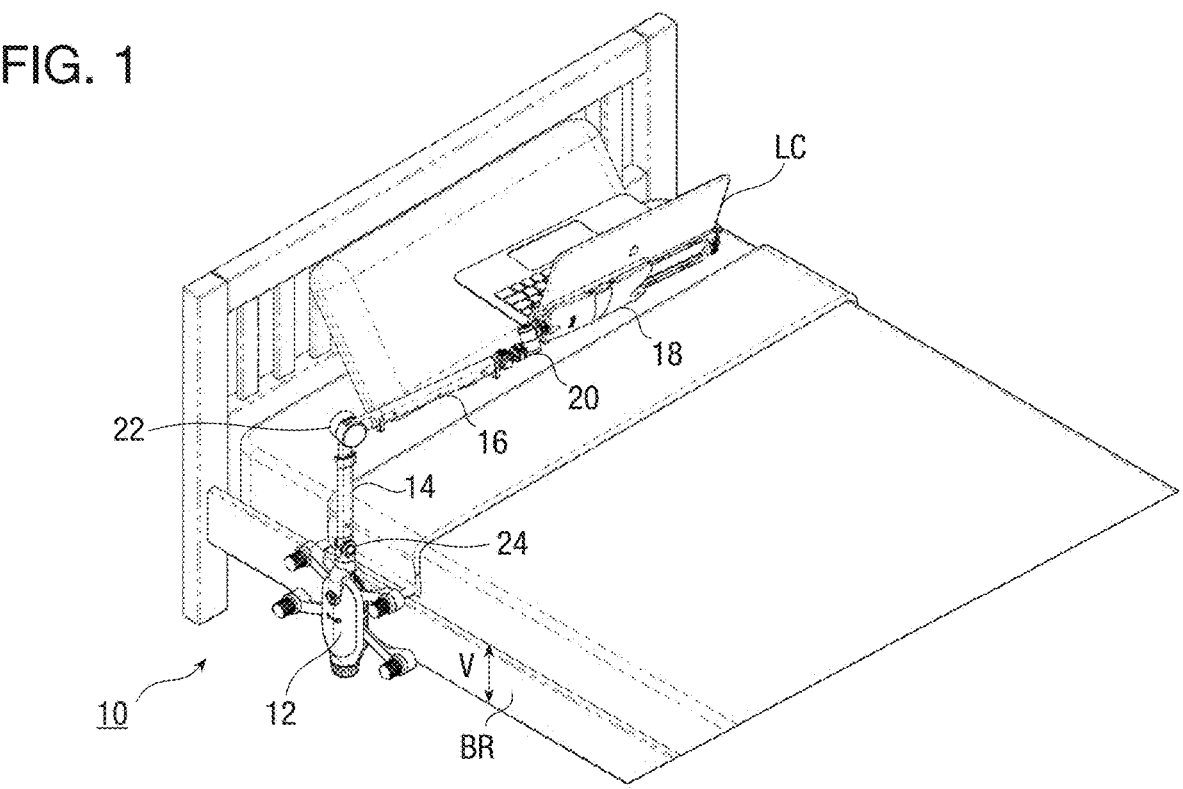
FIG. 1 illustrates an exemplary support fixture formed in accordance with the present invention, particularly illustrating its attachment to a bedrail.

FIG. 1 illustrates an exemplary support fixture 10 formed in accordance with the present invention, in this view shown as attached to a bed rail BR. The details of the clamping mechanism will be discussed in detail below. Bedside support fixture 10 is shown as comprising a clamp component 12, a lower arm 14 attached to clamp component 12, an upper arm 16 attached to a distal end of lower arm 14, and a device support component 18. For purposes of illustration, a laptop computer LC is shown as affixed to device support component 18.

Figure 2:
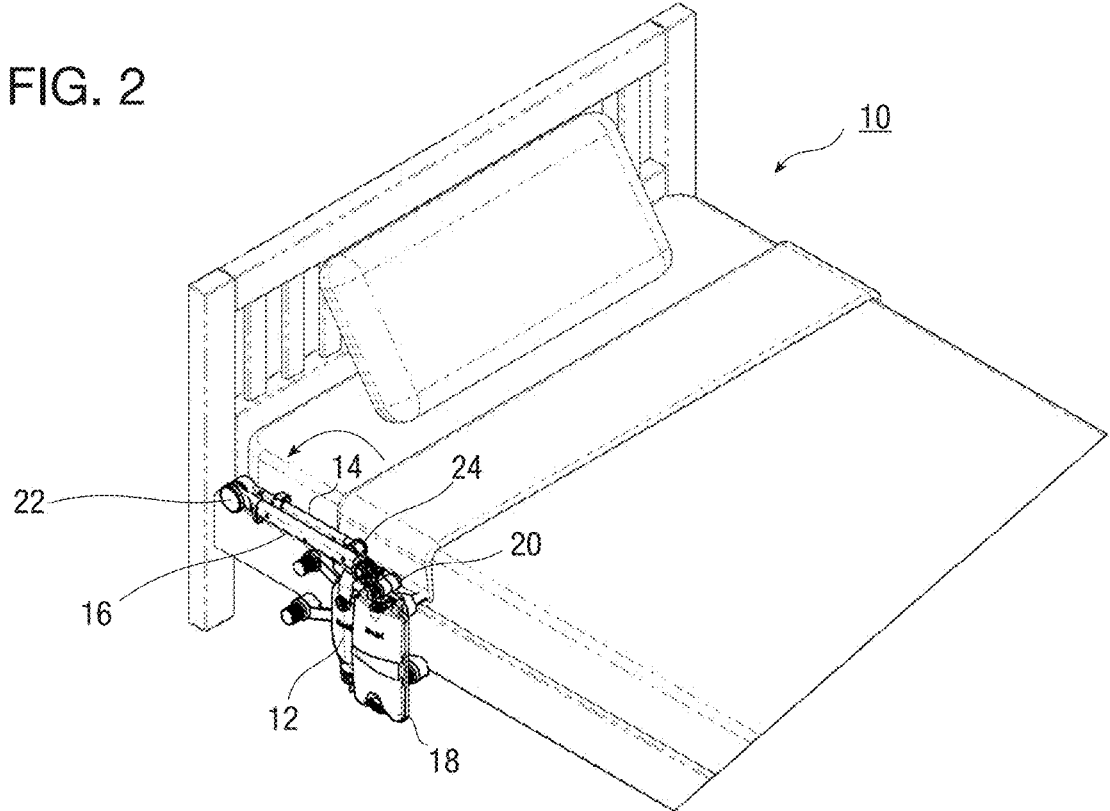
FIG. 2 shows the support fixture of FIG. 1 when folded and rotated downward into a closed position along the bedrail.

As will be discussed in detail below, it is an aspect of the present invention that the connections between clamp 12, lower arm 14, upper arm 16, and are sufficiently articulated to allow for support fixture 10 to be folded and positioned out of the way when not in use (yet remain attached to bed rail BR). FIG. 2 shows support fixture 10 as folded and rotated downward (as indicated by the arrow in FIG. 2) to create a fully compact arrangement when not in use. In particular, device support component 18 is attached to upper arm 16 through a multi-stage gimbal system 20 that allows for the position of device holder 18 to with respect to upper arm 16. An upper arm joint 22 allows for upper arm 16 to be held against lower arm 14. Lastly, a pivot joint 24 is used to attach lower arm 14 to clamp 12 in a manner that allows for lower arm 14 to be moved from its (typically) vertical position as shown in FIG. 1 to a typically horizontal ("stowed") position in FIG. 2.

It is clearly shown by comparing FIG. 1 to FIG. 2 that bedside support fixture 10 is able to quickly and easily be folded and rotated in a compact position when not in use, while not requiring clamp 12 to be removed from bed rail BR. Most prior art types of "over-bed" stands utilize a vertical standard that is attached to a wheeled base and needs to be physically repositioned away from the bed rail. In some situations (such as, for example, a college dorm room or a hospital room) the independent nature of the stand makes it an attractive device to be stolen. Inventive fixture 10 remains physically clamped to bed rail BR and may be further configured in the manner discussed in detail below to include a "tamper resistant" mechanism for attaching clamp 12 to bed rail BR.

Figure 3:
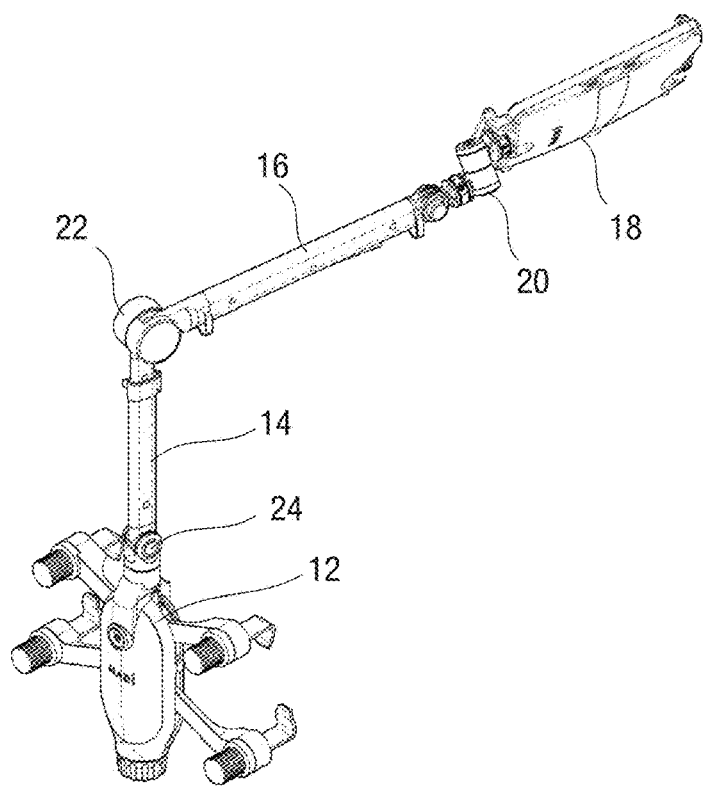
FIG. 3 shows the same support fixture as in FIG. 1, in this case without illustrating an associated horizontal support member (bedrail)
Figure 4:
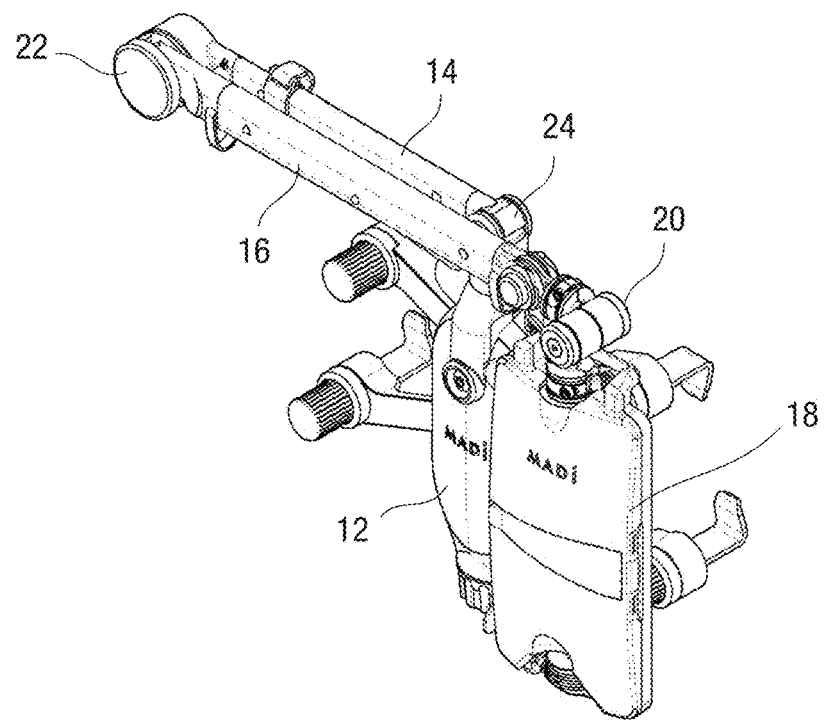
FIG. 4 shows the support fixture of FIG. 1 when folded and rotated downward into a closed position, as seen in FIG. 2.

FIG. 3 illustrates bedside support fixture 10 in its fully extended position, as shown in FIG. 1, in the FIG. 3 view as a free-standing element that is not attached to a bed. Similarly, FIG. 4 illustrates bedside support fixture 10 in its compact "stowed" position. The position and composition of couplers 20, 22, and 24 are clearly shown in FIGS. 3 and 4.

Figure 5:
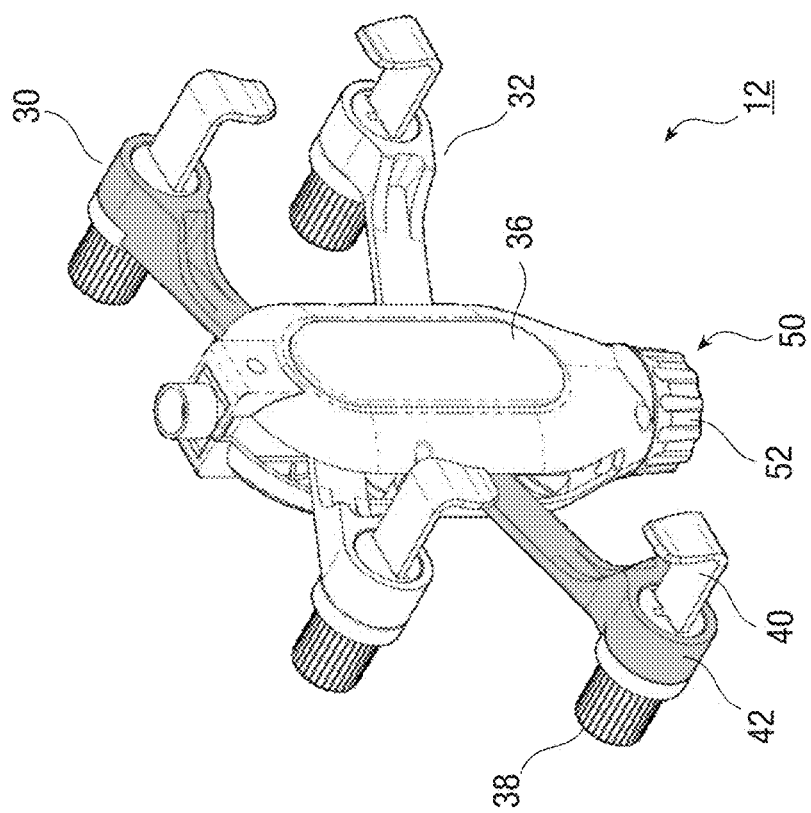
FIG. 5 is a front isometric view of the clamp portion of the inventive support fixture.
Figure 6:
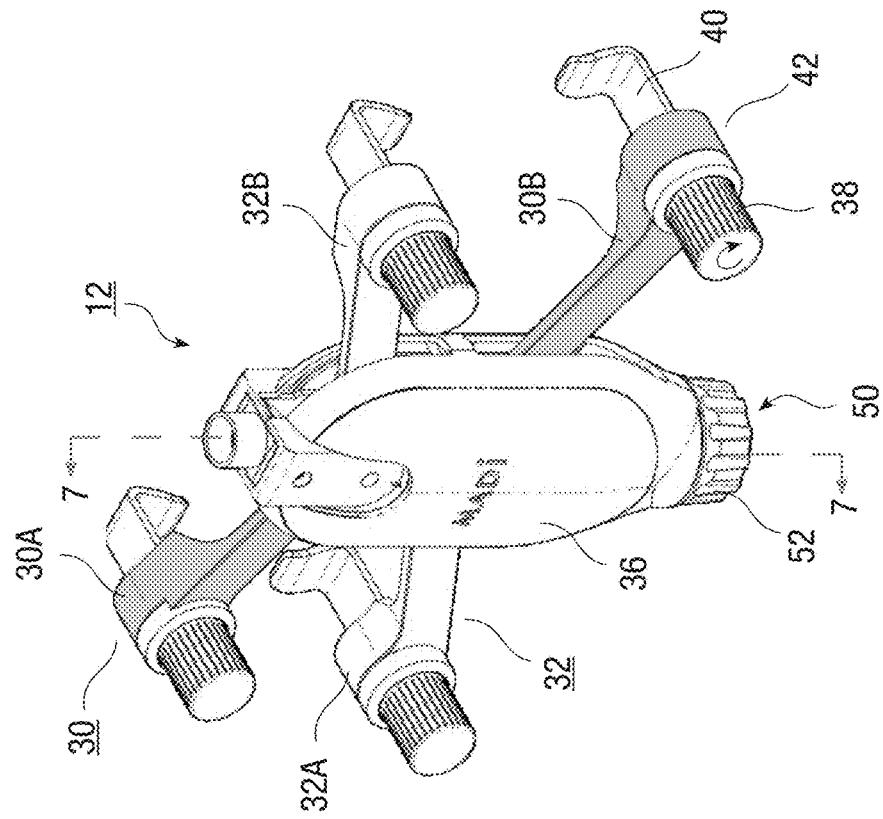
FIG. 6 is a rear isometric view of the clamp shown in FIG. 5.
Figure 7:
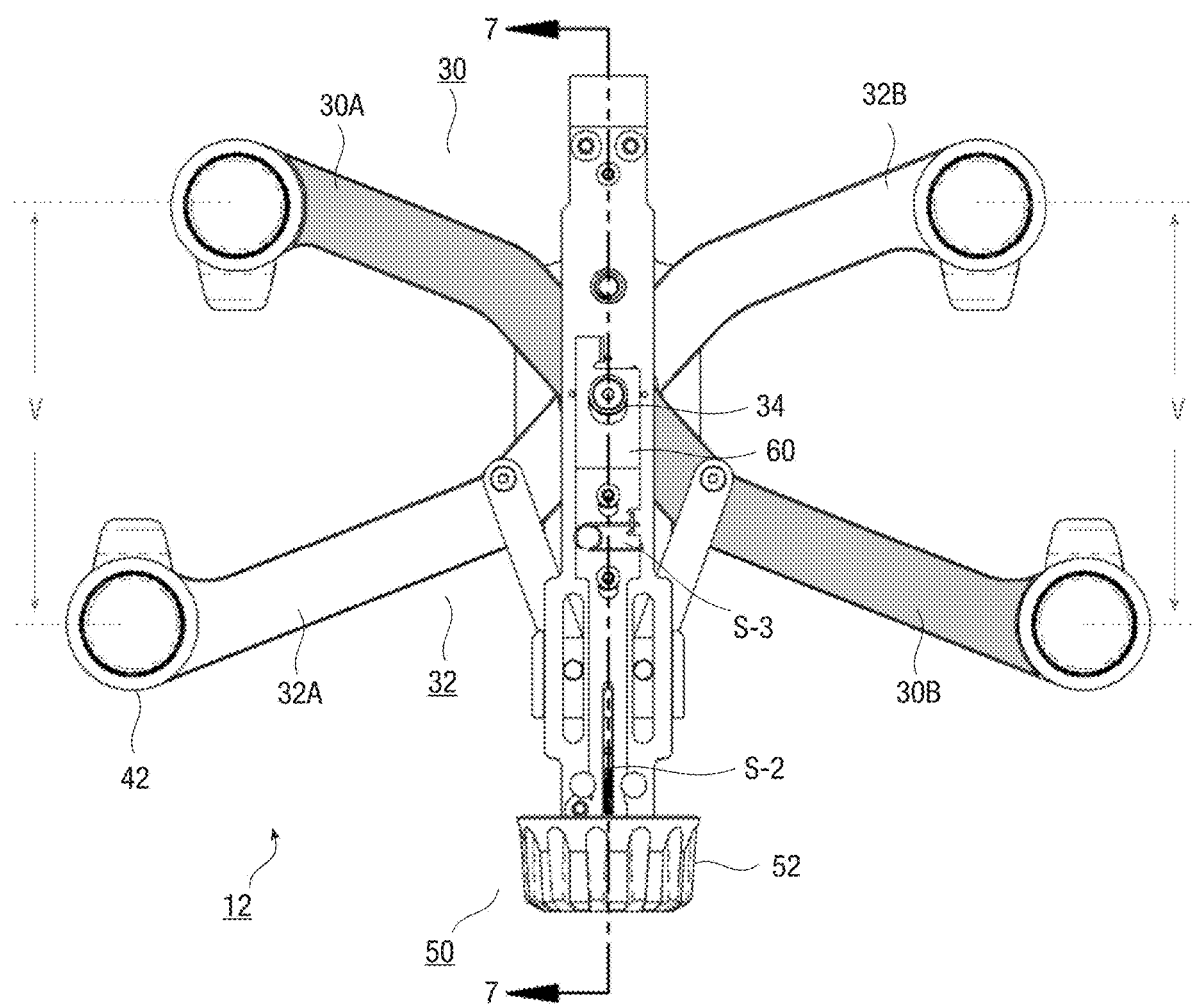
FIG. 7 is a cut-away view of the clamp portion, taken along line 7-7 of FIG. 5.

FIG. 5 is a front isometric view of an exemplary embodiment of clamp 12, with a rear isometric view of clamp 12 shown in FIG. 6. FIG. 7 is a cut-away view taken along line 7-7 of FIG. 5, illustrating various internal elements of clamp 12. Referring to FIGS. 5-7, clamp 12 is shown as comprising a pair of opposing scissor arms 30, 32. For clarity purposes, scissor arm 30 is shaded in the views of FIGS. 5 and 7 so as to clearly illustrate its position relative to scissor arm 32. Scissor arms 30, 32 cross each other and are connected together at a central pivot location 34 (shown in FIG. 7). Thus, the pair of arms are disposed such that arm portions 30A, 32A are disposed on one side (e.g., left-hand side) of a main body 36 of clamp 12, and arm portions 30B, 32B are disposed on the opposite side (e.g., right-hand side) of main body 36.

An outer termination of each arm portion includes a paired combination of clamp knob 38 and a clamp foot 40, where the rotation of clamp knob 38 is used to control the lateral separation between clamp foot 40 and its associated scissor arm termination. These scissor arm terminations are referred to as arm collars 42 at times. With reference to FIG. 1, the turning of clamp knobs 38 results in clamping a portion of bed rail BR between arm collar 42 and clamp foot 40. Additional details regarding specific configurations and embodiments of scissor arms 30, 32 and how they are used to attach clamp 12 to a bed rail or other type of support member may be found in co-owned U.S. Pat. No. 10,823, 329, issued on Nov. 3, 2020 and herein incorporated by reference.

Figure 8:
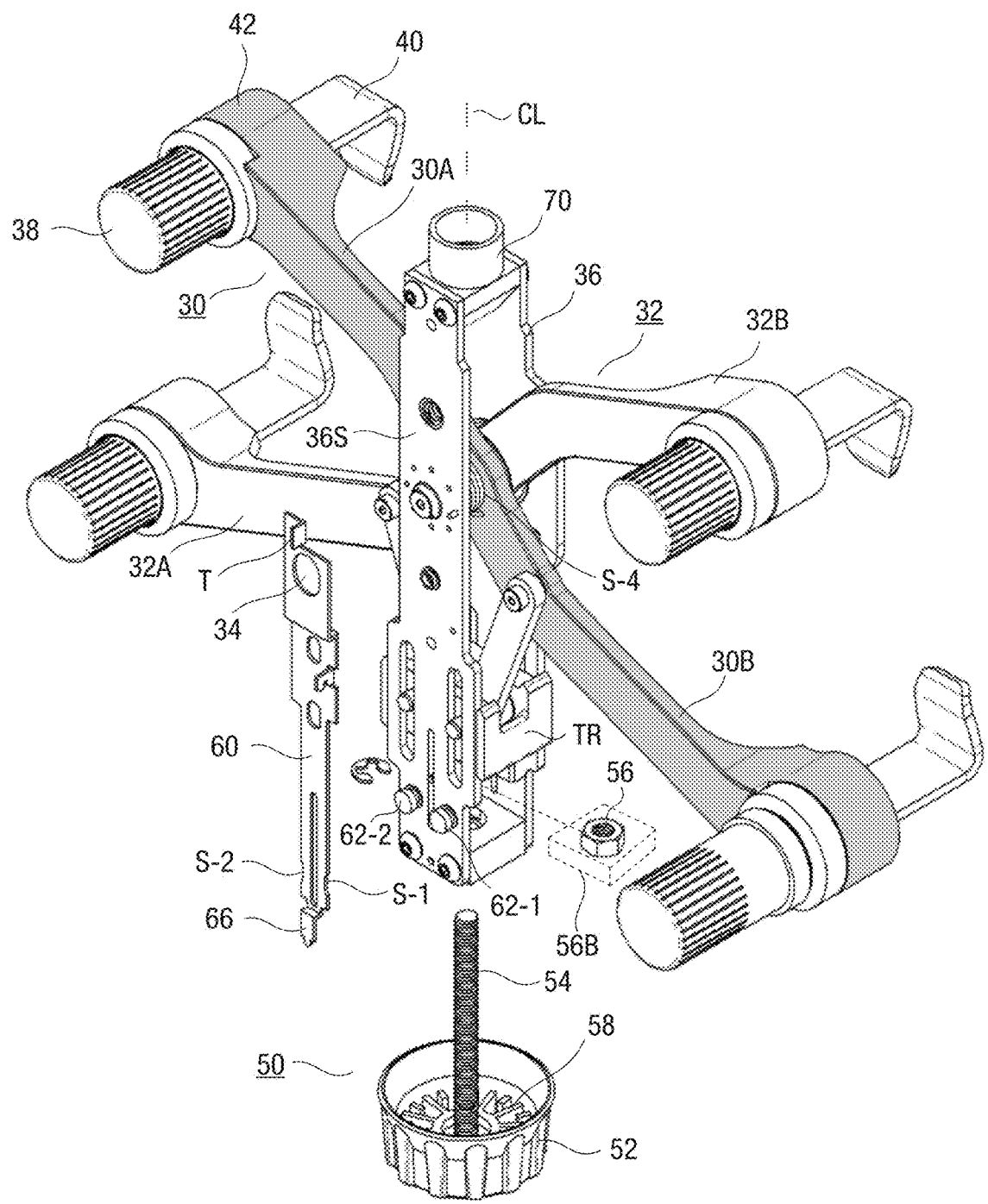
FIG. 8 is an exploded view of the arrangement shown in FIG. 7.

In accordance with the teachings of the present invention, clamp 12 is formed to include a locking mechanism 50 that is utilized to maintain the vertical spacing V between arm portions 30A, 32A, as well as between arm portions 32B and 30B. The spacing V corresponds to the height of the support member, such as bed rail BR of FIG. 1. An adjustment mechanism as fully described in the '329 patent, including a spring S-4 as seen in FIG. 8 to bias the scissor arms together, may be used in the first instance to properly position arm portions 30A, 30B, 32A, and 32B. Alternatively, they may be manually adjusted by the user to ensure their placement with respect to the support member. Once properly positioned, and then fixed in place using the combination of clamp knob 38 and clamp foot 40, locking mechanism 50 is employed to ensure that the attachment does not come loose over time. This is particularly important in the implementation of bedside support fixture 10, since it needs to remain sturdy while supporting relatively expensive computer devices.

FIG. 8 is an exploded view of the arrangement of FIG. 7, and the workings of locking mechanism 50 may best be understood by reference to both illustrations (as well as the prior drawing figures). In particular, locking mechanism comprises a knob 52 that is coupled to clamp body 36 in a manner described below, where knob is positioned along a center line CL of clamp body 36. An internal drive screw 54 (best shown in FIG. 8) is attached at a first termination to the underside of knob 52, in particular to the center of the underside. Once scissor arms 30, 32 have been positioned to grip a bed rail (or any appropriate type of support rail), a locking nut 56 (which is located below scissor arms synchronizing trolley TR) is disposed over drive screw 54. Locking nut 56 may instead comprise a threaded bracket or nut located within a bracket 56B formed to resist its rotation when screw 54 is rotated. Therefore, as knob 52 is rotated, drive screw 54 moves locking nut or threaded bracket 56 upward to be in position against the bottom of synchronization trolley TR, thereby preventing scissor arms 30, 32 from releasing their grip on the bed rail.

Advantageously, locking mechanism 50 further comprises a plurality of security locking ribs 58 disposed inside knob 52, surrounding internal drive screw 54. FIG. 8 best illustrates security locking ribs 58. Additionally, locking mechanism includes a slidable security bracket 60 that engages with front surface 36S of clamp body 36. Slidable security bracket 60 is shown as including a pair of relief notches S-1 and S-2 that engage with a pair of pins 62-1, 62-2 on clamp body 36, allowing for bracket 60 to have freedom of movement in the longitudinal direction along the extent of channel 34. Slidable security bracket 60 is maintained in an upward position by spring S-3 until the arm clamp is attached. Slidable security bracket 60 terminates in a locking pin 66 that engages with a proper locking rib 58 when locking mechanism is in its final down position (i.e., when nut 56 reaches synchronization trolley TR, thus creating an arrangement where scissor arms 30, 32 are firmly held in position. As a result of this configuration, it is not necessary to apply excessive torque to clamping knob 52 to ensure that the clamp is securely held against the support beam. Once clamp 12 has been secured in place, a bracket 68 (shown in FIGS. 9 and 10) is positioned over arm post 70, thereby pressing tab T of slidable security bracket 60 downward, engaging with locking ribs 58 to prevent clamp knob 52 from being loosened and securing the assembly when anti-tamper security screw 71 has been tightened in place.

FIGS. 9 and 10 illustrate an exemplary attachment configuration between clamp 12 and lower arm 14 as provided by pivot joint 24. FIG. 9 is an isometric front view of their combination, and FIG. 10 is taken from the same perspective, but is an exploded view that illustrates the various components forming pivot joint 24. In this particular embodiment, an arm support bracket 68 is used to provide the mechanical attachment between clamp 12 and pivot joint 24. Arm support bracket 68 is shaded in the view of FIGS. 9 and 10 to assist in identifying its location between components. Arm support bracket 68 is positioned over the center of body 36, and particularly located over an arm post 70 formed along the top edge of body 36. Bracket 68 presses down on tab T when fully seated over arm post 70, thereby moving locking pin 66 downward to engage with locking ribs 58. In preferred embodiments, arm support bracket 68 is held in place by screw 71 that enables the connection to be tamper resistant by virtue of its anti-tamper driver slot.

As mentioned above, an aspect of the present invention is the ability to create a support, for example a bedside support, that is articulated in a manner that permits the components to be rotated with respect to each other and folded into a compact form that may be stowed when not in use. Indeed, an important feature of this articulated arrangement is that the clamp portion of the support may stay fixedly in place along a support member with the rest of the components rotated and folded into positions adjacent to clamp 12 (see FIGS. 2 and 4, for example). Pivot joint 24 is one component of the inventive arrangement that facilitates this articulation capability.

Referring to FIGS. 9 and 10, pivot joint 24 is shown as including a friction plate 72 and associated friction gasket 74, where in some cases friction plate 72 may be incorporated into the piece-part of arm attachment bracket 68. A pair of rotation lock keys may be used to secure the attachment of pivot joint 24 to clamp 12 so that it will not loosen when rotated. A controlled pivoting coupler 76 is also included in pivot joint 24 and is used to couple a distal end of lower arm 14 to friction plate 72 via a screw 73. Controlled pivoting coupler 76 is a crucial component in allowing for lower arm 14 to rotate with respect to clamp 12. In the depiction of FIGS. 9 and 10, lower arm 14 is positioned to be longitudinally aligned with clamp 12; indeed, positioned along the vertical axis of clamp 12. The articulation is provided by using controlled pivoting coupler 76 to move an attached lower arm 14, in particular to rotate lower arm 14 downward (either to the right (positive rotation) or left (negative rotation) with respect to this default vertical positioning.

Figure 11:
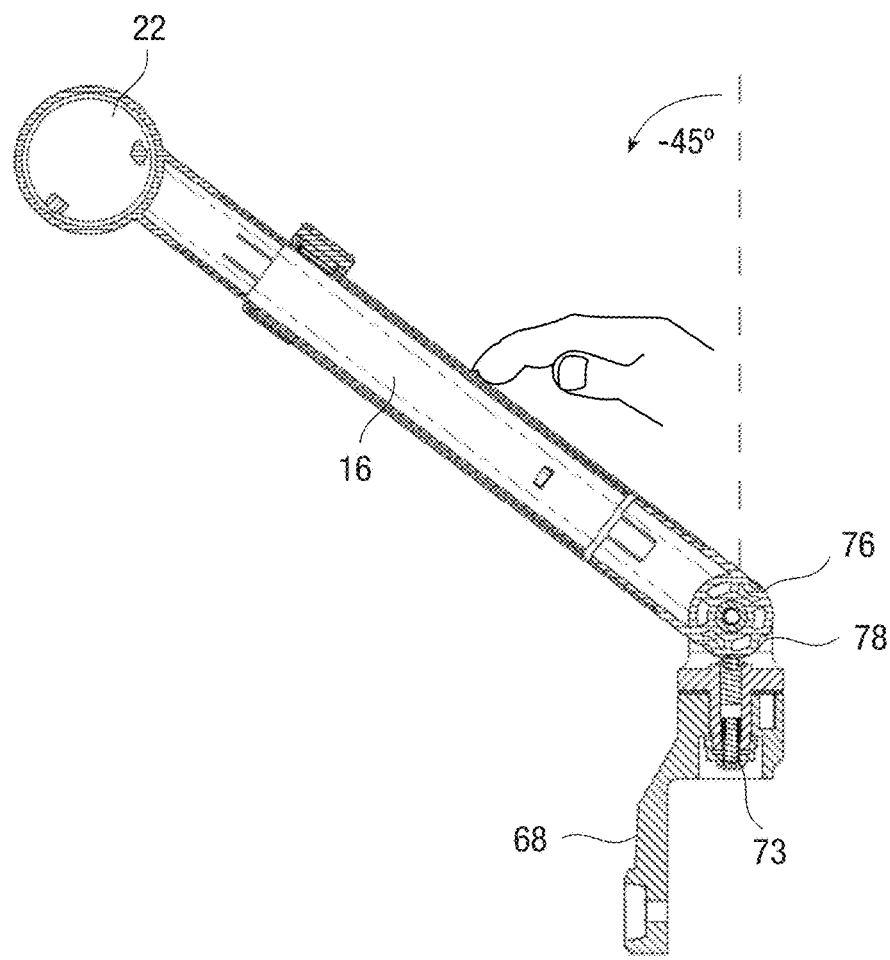
FIG. 11 illustrates the use of a pivoting coupler to rotate the lower arm element into a −45 degree position (with respect to the vertical)
Figure 12:
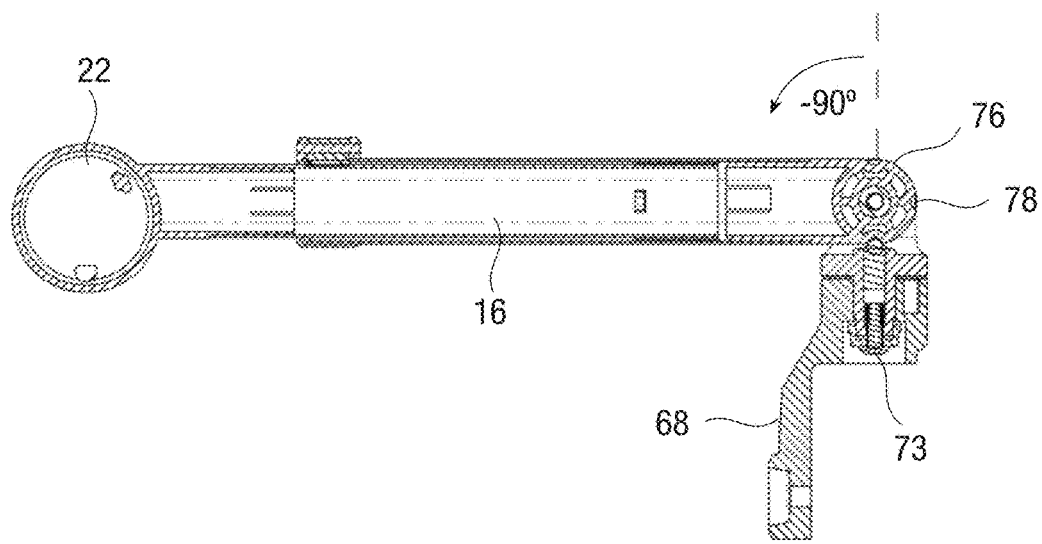
FIG. 12 shows the same components as in FIG. 11, but in this case the pivoting coupler is used to further rotate the lower arm element into a −90 degree position.
Figure 13:
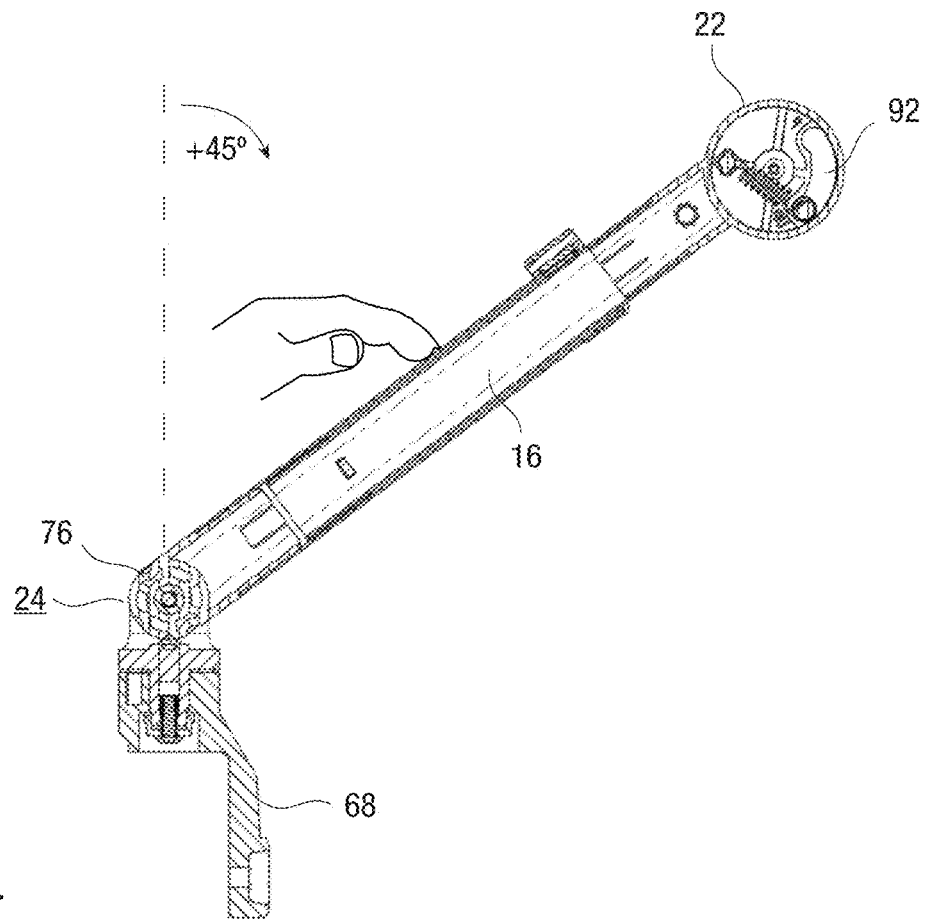
FIG. 13 illustrates an arrangement similar to FIG. 11, but using the pivoting coupler to rotate the lower arm element into a +45 degree position with respect to vertical.
Figure 14:
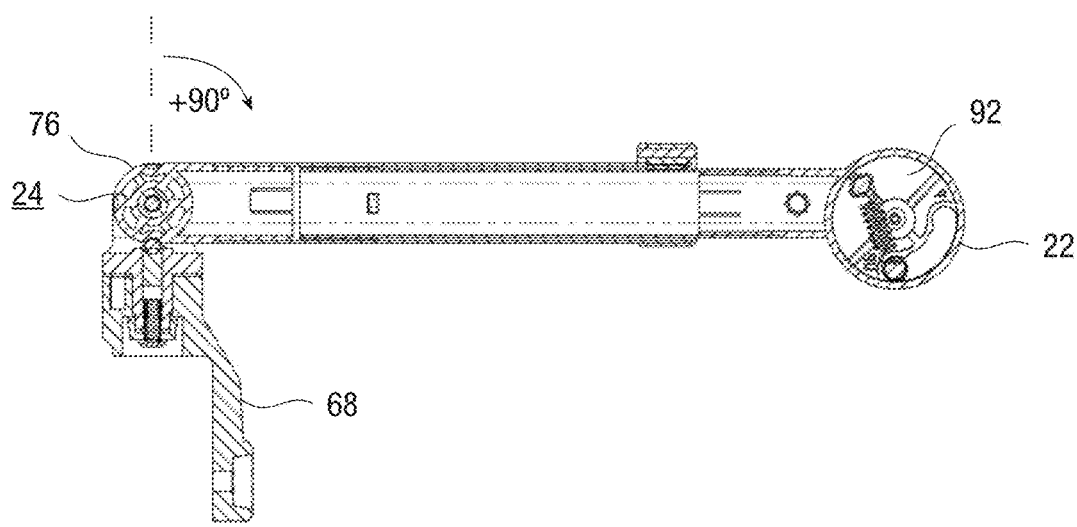
FIG. 14 is related to FIG. 13, and illustrates the use of the pivoting coupler to further rotate the lower arm element forward into a +90 degree position.

As discussed below in association with FIGS. 11-15, controlled pivoting coupler 76 is preferably formed to include a plurality of detents 78 around its periphery that enable the creation of specific angular positions of lower arm 14 with respect to clamp 12, holding lower arm 14 in that position until again moved by the user (either to raise up to typically vertical for use, or rotate downward to typically horizontal for storage). FIG. 11 illustrates using controlled pivoting coupler 76 to rotate lower arm 14 into a position of −45 degrees with respect to vertical, with FIG. 12 illustrating the further use of controlled pivoting coupler 76 to rotate lower arm 14 downward into a −90 degree (i.e., horizontal) position. FIGS. 13 and 14 illustrate a similar capability provided by controlled pivoting coupler 76 to allow for forward rotation of lower arm 14 with respect to the vertical axis of clamp 12.

Figure 15:
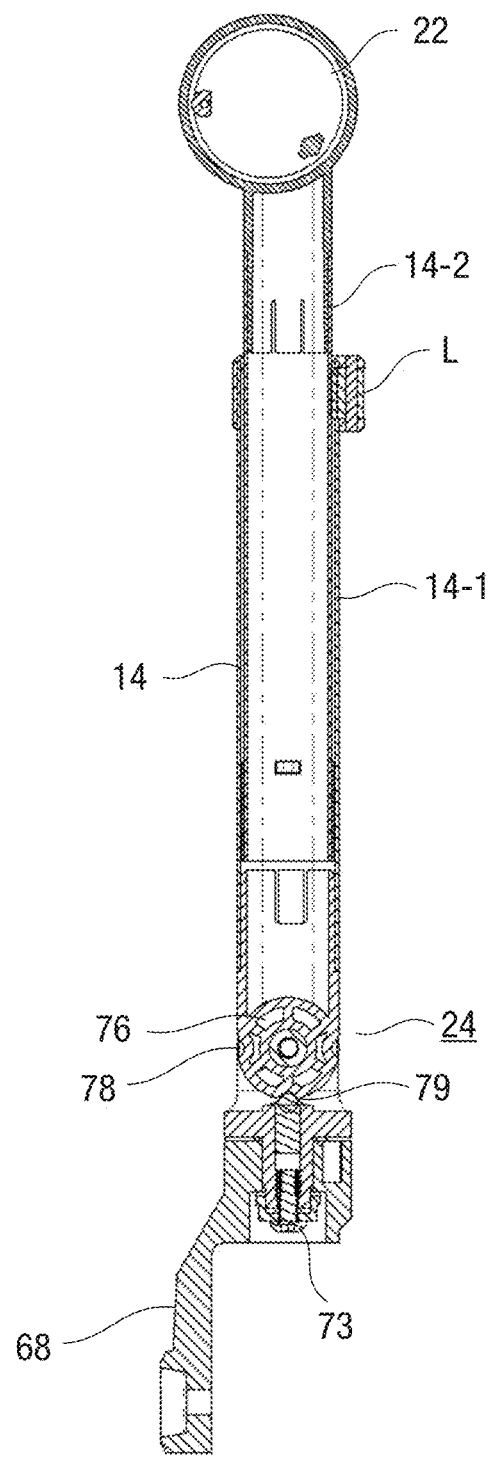
FIG. 15 is a cut-away side view of an arm support bracket utilized within the support fixture of the present invention.

FIG. 15 is a cut away side view of arm support bracket 68, pivot joint 24 and lower arm 14, where the utilization of detents 78 around the periphery of controller pivoting coupler 76 is clearly shown. In particular, a series of detents 78 are used to form a set of depressions around coupler 76. A stopper 79, in the form of a hemisphere is positioned as shown to engage with detents 78 as coupler 76 rotates, so as to hold coupler 76 at a desired position until a force is applied that overcomes this binding and then "clicks" the next detent 78 into position over stopper 79. In some embodiments, lower arm 14 may be formed as a telescoping arm, which is also depicted in the view of FIG. 15. Here, lower arm 14 comprises an outer, fixed member 14-1 that is attached to pivot coupler 24. An interior arm member 14-2 is capable of moving inward/outward along the main axis of lower arm 14 so as to extend the height of lower arm 14 as needed. A conventional locking configuration L well-known in the art may be used to releasably fix the position of interior arm member 14-2 with respect to exterior arm member 14-1.

Figure 16:
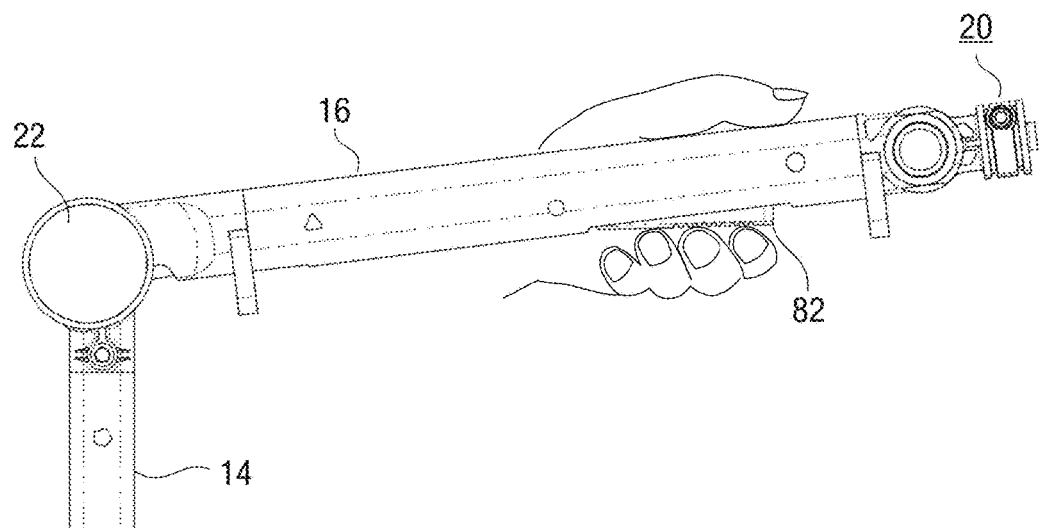
FIG. 16 is a side view of an upper arm element and arm joint element as coupled together within the inventive support fixture.

Continuing with reference to FIG. 15, a cut-away side view of upper arm joint 22 is shown as coupled to the opposing, distal end of lower arm 14, which is used in the manner described below to control the orientation of upper arm 16 with respect to lower arm 14. FIG. 16 is a side view of upper arm 16 and arm joint 22 as coupling together lower arm 14 and upper arm 16. In accordance with the principles of the present invention, when fixture 10 is deployed and in use, lower arm 14 remains in a fixed position attached to clamp 12. However, the formation of a fully articulated support fixture 10 requires that upper arm 16 be angularly adjustable with respect to lower arm 14, so as to accommodate different positions (as well as physical sizes) of the various users. That is, upper arm 16 needs to be able to move through a range of motions, preferably in a manner that provides for a continuous adjustment (as opposed to the series of fixed adjustments between lower arm 14 and clamp 12).

In accordance with the principles of the present invention, a trigger release mechanism 82 is included within upper arm 16 and coupled to upper arm joint 22 in a manner described below to provide this type of adjustment. It is contemplated that various types of trigger releases may be employed, where in one embodiment a compressed gas cylinder hydraulic type of mechanism may be used. Alternatively, the trigger release mechanism may comprise a spring-loaded arrangement including a binding rod and apertures plate to provide the control.

Figure 17:
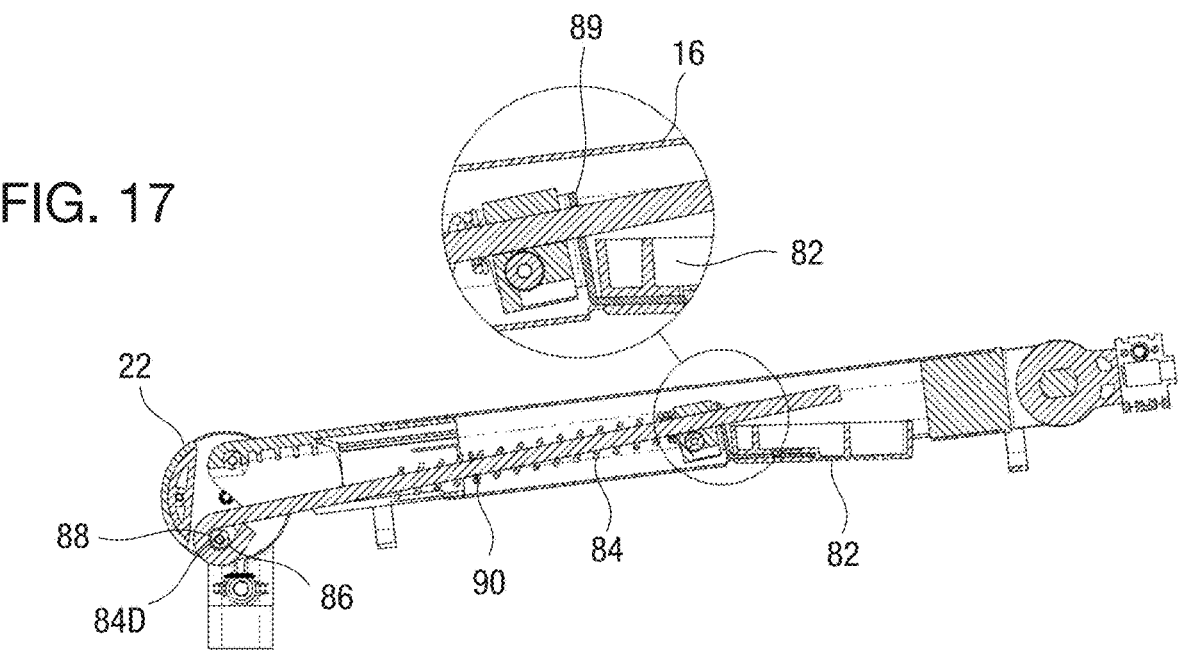
FIG. 17 is a cut-away side view of the upper arm element, illustrating in particular an exemplary trigger release mechanism.

FIG. 17 is a cut-away side view of upper arm 16 showing the use of this type of mechanism. In particular, the spring-loaded arrangement includes a binding rod 84 that is coupled to upper arm pivot 22 at a distal termination 84D. Inasmuch as upper arm 16 needs to rotate freely with respect to lower arm 14 via pivot 22, distal termination 84D is shown as including an aperture 86 that fits over a pin 88 within pivot 22. An apertured binding plate 89 is shown as positioned over binding rod 84, where the movement of apertured binding plate is controlled by trigger 82. A compression spring 90 is shown as surrounding a longitudinal extent of binding rod 84, and is attached to trigger 82. Upon pressing trigger 82 (with a continuing application of force), compression spring 90 is released, allowing binding rod 84 to move back and forth within upper arm 16 and thereby allow upper arm 16 to freely rotate with respect to lower arm 14. Once the desired orientation between the arms is found, trigger 82 is released, which blocks binding rod 84 from passing through apertured binding plate 89, returning compression spring 90 to its compressed state, thereby holding upper arm 16 motionless until trigger 82 is activated again.

Another feature of the configuration of the present invention is the ability of upper arm pivot 22 to override the operation of trigger 82 and move upper arm 16 back into a stable, horizontal position upon the presence of excessive downward force being applied to upper arm 16. For example, if an individual is not familiar with the use of trigger 82 to provide movement for upper arm 16 and is attempting to force the arm to move downward, or if an individual falls against upper arm 16 when in a raised position, it is advantageous to be able to overcome the excessive force and prevent damage to the fixture and/or any supported electronic devices, as well as prevent harm to an individual.

Figure 18:
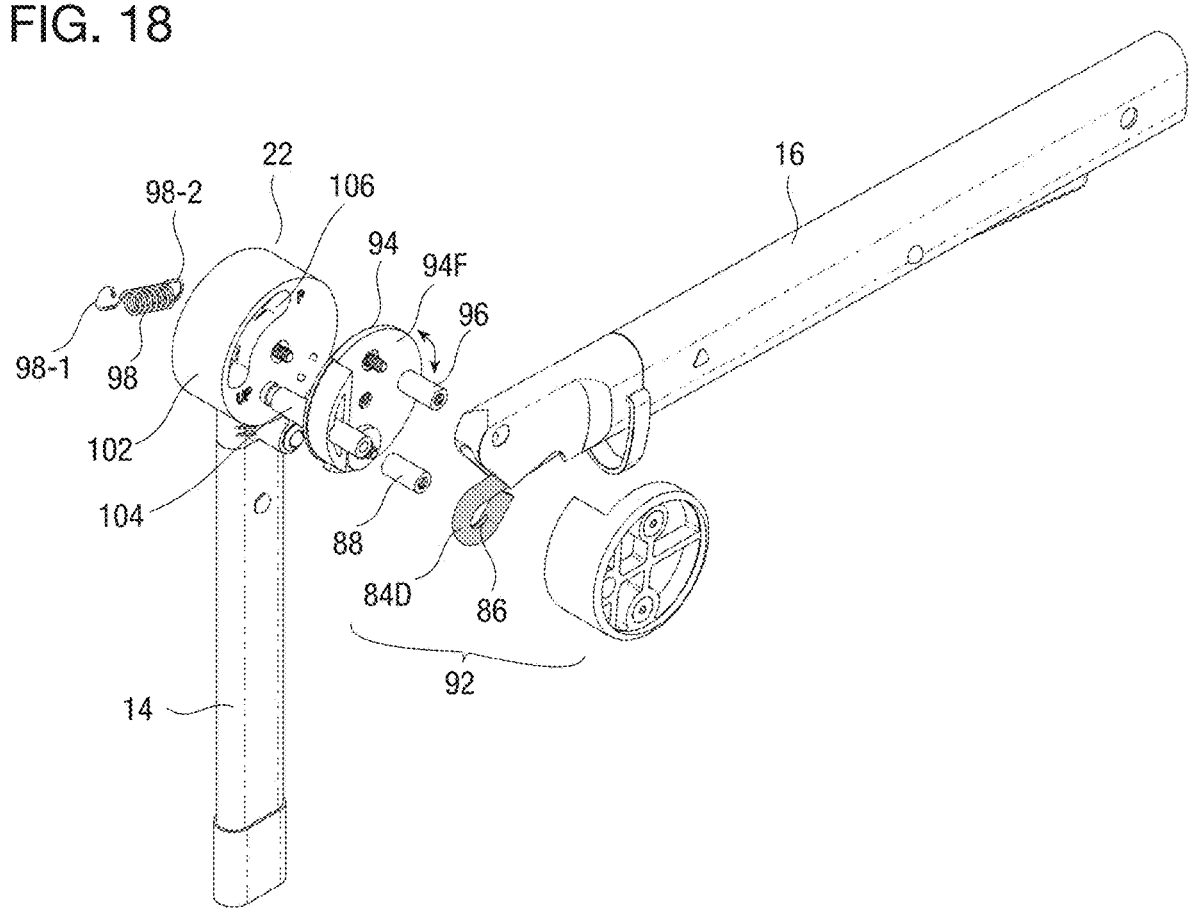
FIG. 18 is an exploded isometric view of the arm pivot element, including a bypass toggle element.
Figure 19:
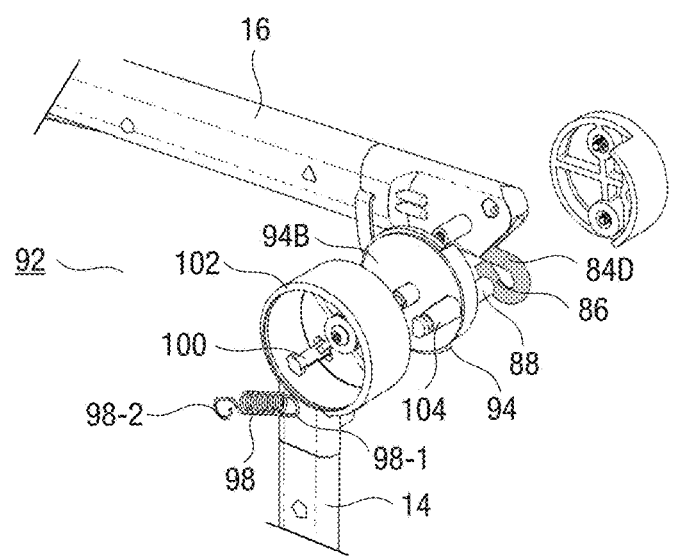
FIG. 19 is another exploded view of the arrangement of FIG. 18, taken along a different axis.
Figure 20:
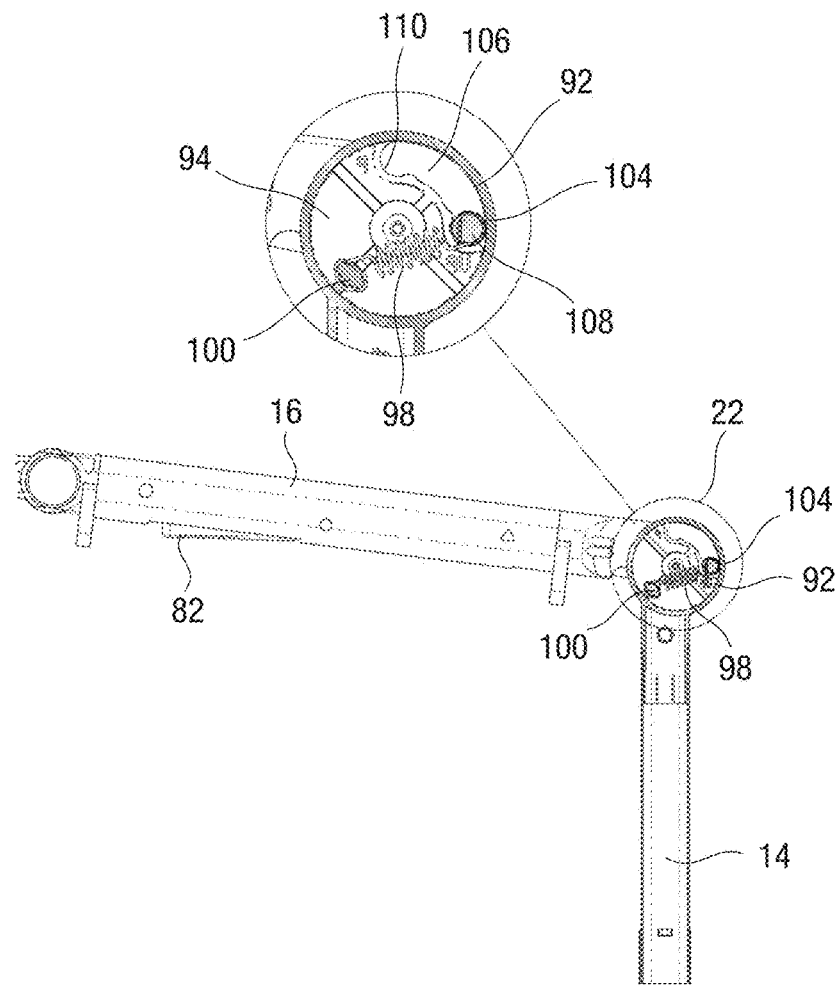
FIG. 20 illustrates the relationship between the upper and lower arm elements within a support fixture formed in accordance with the present invention.
Figure 21:
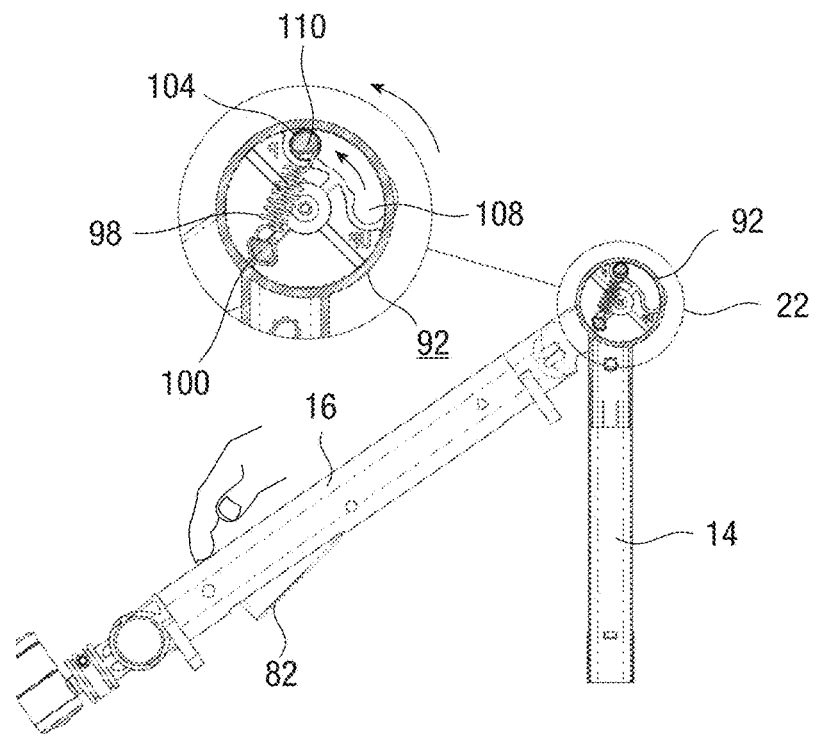
FIG. 21 depicts the action of the upper arm element in the presence of an applied excessive force.

FIG. 18 is an exploded isometric view of arm pivot 22 including a bypass toggle mechanism 92. FIG. 19 shows another exploded isometric view, taken along an opposing axis. FIGS. 20 and 21 contain cut-away side views of the illustration of FIG. 19, with FIG. 20 showing the positioning of bypass toggle mechanism 92 in a standard operation situation and FIG. 21 showing the shift of internal components within bypass toggle mechanism 92 to overcome the application of excessive force to upper arm 16.

Referring in particular to FIGS. 18 and 19, toggle mechanism 92 is shown as including a rotating toggle plate 94, with binding rod pivot pin 88 and an upper arm pivot pin 96 attached to a front surface 94F of plate 94 as shown. Toggle spring 98 is shown as disposed beyond an opposing back side 94B of rotating toggle plate 94. A first end 98-1 of toggle spring 98 is secured to a toggle spring anchor post 100. An opposing second end 98-2 of toggle spring 98 is shown as passing through a housing member 102 and secured to a toggle spring attachment post 104. A channel 106 is formed in housing member 102 and allows for the rotation of toggle plate 94 when necessary.

FIG. 20 illustrates the relationship between upper arm 16 and lower arm 14 in a normal situation where no excessive force is being applied to upper arm 16. An enlarged view of toggle mechanism 92 is shown in the inset of FIG. 20, illustrating the relative positions of anchor post 100 and attachment post 104, as coupled together via toggle spring 98. In particular, attachment post 104 is shown as positioned against a first seat location 108 of channel 106. The contoured shape of channel 106 clearly shows that in a conventional working configuration, toggle plate 94 will remain motionless and attachment post 104 will remain secured against first seat location 108.

The application of excessive downward pressure on upper arm 16 (without activating trigger 82) is depicted in FIG. 21. When the applied pressure becomes excessive, toggle plate 94 rotates into a release position, which in turn rotates attachment post 104 into an opposing second seat location 110 along channel 106. This rotation of toggle plate 94 changes the relative positioning between arm pivot pin 96 and binding rod pivot pin 88. The bias applied by spring 98 ensures that toggle plate 94 may only be situated in its "normal" orientation with attachment post 104 aligned with first seat location 108 or "bypass" orientation with attachment post 104 aligned with second seat location 110.

Figure 22:
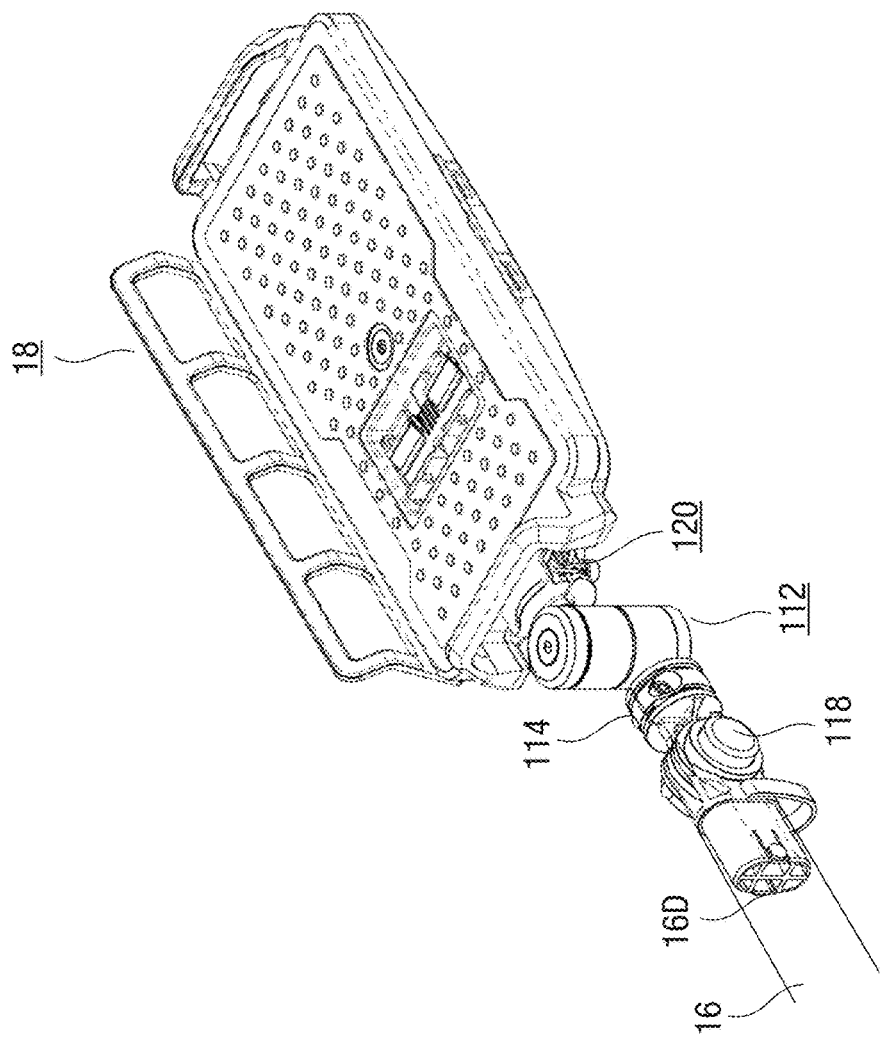
FIG. 22 is an isometric view of a multi-stage gimbal for providing articulated connection between the upper arm element and the device support component of the support fixture of the present invention.
Figure 23:
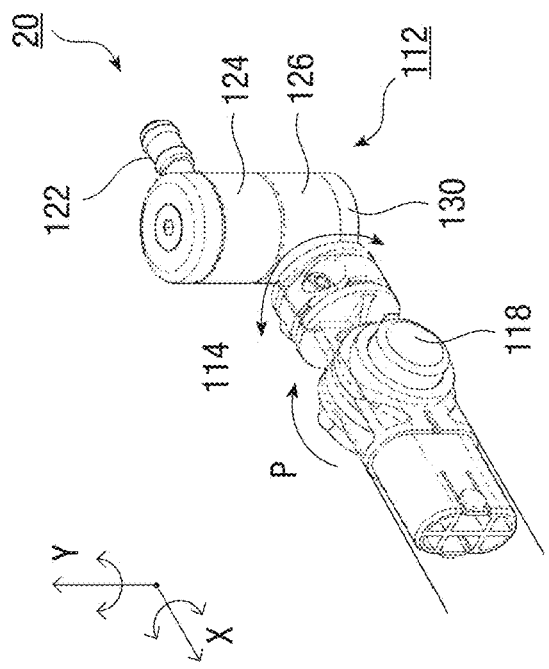
FIG. 23 is an enlarged view of the multi-stage gimbal as shown in FIG. 22.
Figure 24:
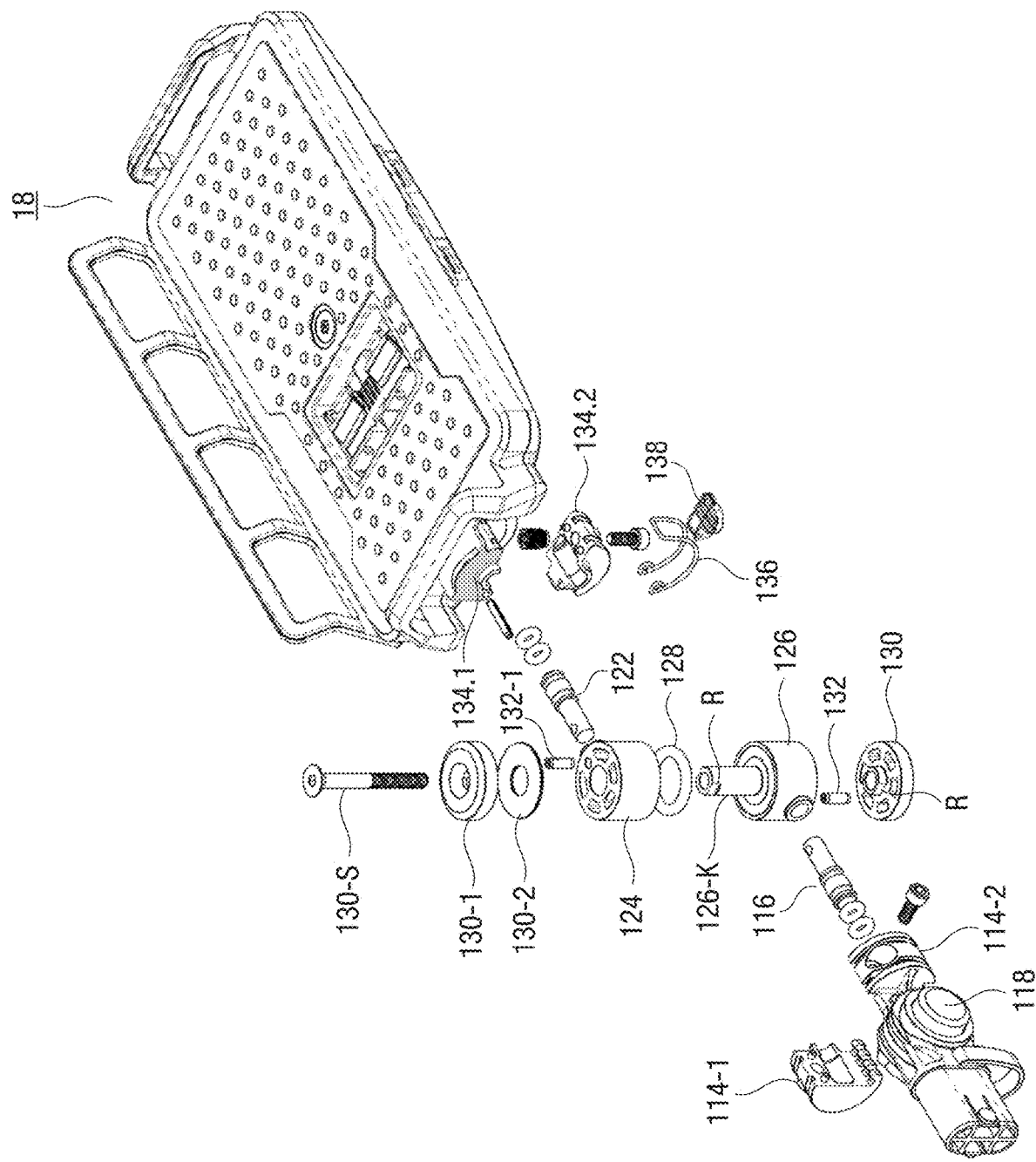
FIG. 24 is an exploded view of an arrangement for including a quick release cylinder joint between the device support component and the upper arm element (see FIG. 22)

FIG. 22 is an isometric view of multi-stage gimbal system 20 as providing an articulated attachment between a distal end 16D of upper arm 16 and device support component 18. FIG. 23 is an enlarged view of gimbal system 20, and FIG. 24 is an exploded version of the isometric view of FIG. 22. Gimbal system 20 is shown as comprising a yaw friction barrel joint 112, allowing for rotation between upper arm 16 and device support component 18 about the y-axis direction, as shown. A cylindrical friction joint 114 is shown as coupled to friction barrel joint 112 through a coupler 116 (coupler 116 shown in the exploded view of FIG. 24). As shown, cylindrical friction joint 114 is oriented to provide rotation about the horizontal x-axis direction, as also shown in FIGS. 22 and 23. An additional stage in multi-stage gimbal system 20 includes a pivot joint 118, allowing for an angular change in position between upper arm 16 and device holder component 18, further supplementing the articulating attachment between the elements forming fixture 10.

In a preferred embodiment of the present invention, multi-stage gimbal system 20 further comprises a "quick release" cylinder joint 120, which allows for device holder component 18 to be removed from fixture 10 and used as an independent, standalone configuration for supporting one or more electronic devices. As shown in FIG. 24, quick release cylinder joint 120 may be coupled to friction barrel joint 112 through a rotatable attachment pin 122 (attachment pin 122 clearly illustrated in FIGS. 23 and 24).

In the exploded view of FIG. 24, friction barrel joint 112 is shown as comprising an upper barrel 124 and a lower barrel 126 separated by a center O-ring 128. A keyed end plate 130 is positioned below lower barrel 126, and locked into position via a keyed recess R in lower barrel 126. Lower barrel 126 also includes a keyed shaft 126-K that extends upward through a non-keyed center aperture in upper barrel 124 and locks into a keyed upper end plate 130-1. By keying together lower barrel 126 with lower end plate 130 and upper end plate 130-1, screw 130-S is prevented from either being loosened or tightened when barrels 124 and 126 need to be rotated relative to each other, since all tightened components move as a unit when upper barrel 124 is rotated around shaft 126-K to achieve its yaw movements.

A slip washer 130-2 may be included and used to reduce friction between upper barrel 124 and upper end plate 130-1, allowing upper barrel 124 to rotate, even when screw 130-S is tightened again O-ring 128. It is to be noted that pin 132 locks rotatable attachment pin 116 to lower barrel 126, while a similar pin 132-1 locks rotatable attachment pin 122 to upper barrel 124.

Figure 25:
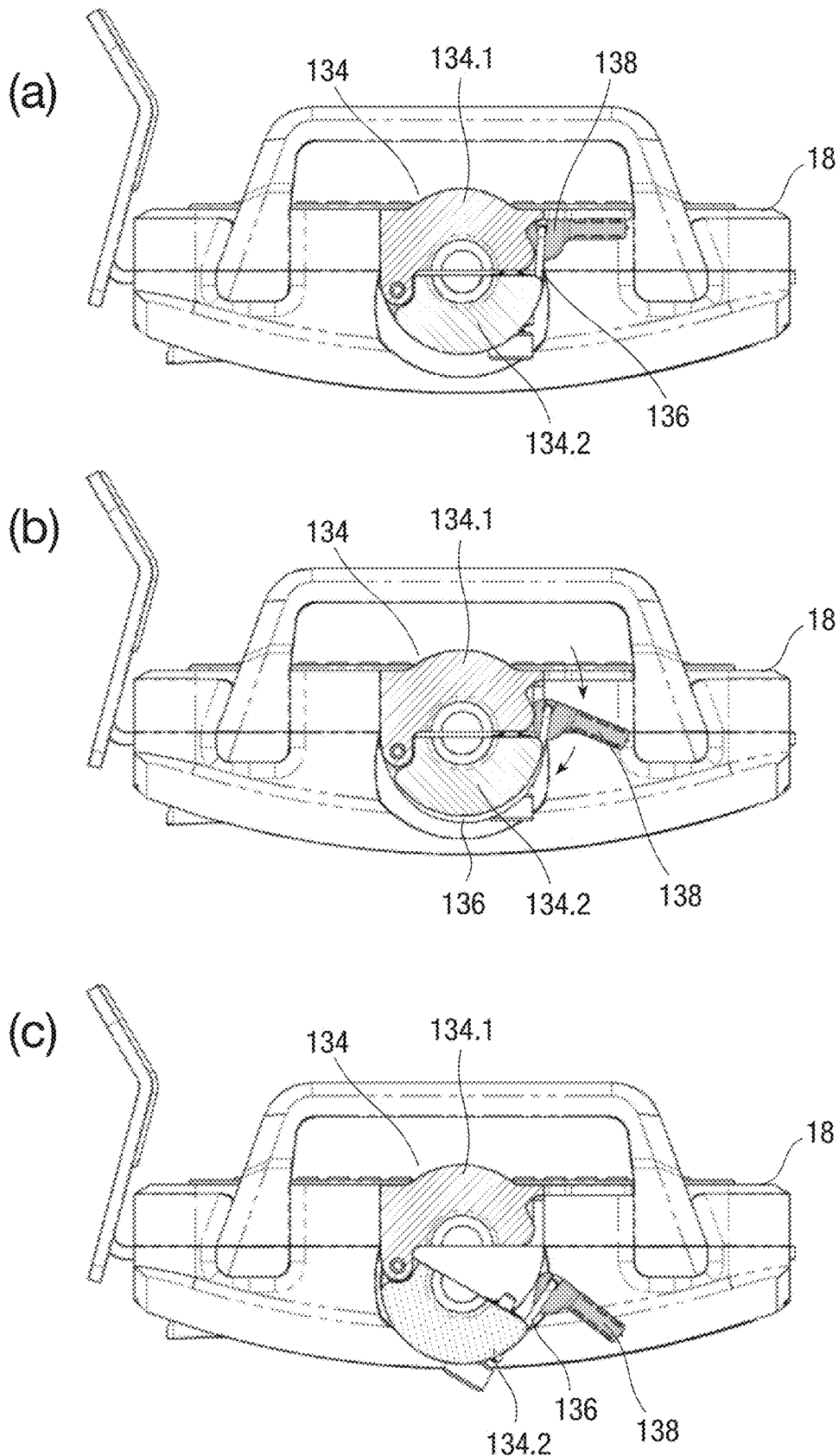
FIG. 25 demonstrates the operation of the quick release cylinder joint of FIG. 24, where

Cylindrical friction joint 114 is shown as comprising friction cylinder halves 114-1 and 114-2. Quick release cylinder joint 120 is shown as comprising a two-piece shell cylinder 134 (illustrated in FIG. 25), a quick release wire 136, and a quick release lever 138. A first piece 134.1 of two-piece shell cylinder 134 is shown as attached to device holder component 18, where the remaining second piece 134.2 is attached to multi-stage gimbal system 20. Second piece 134.2 is shown as supported in place against first piece 134.1 by quick release wire 136, where upon movement of lever 138, wire 136 drops down and allows for second piece 134.2 of shell cylinder 134 to come away from device holder component 18. FIG. 25 demonstrates the operation of quick release cylinder joint, where FIG. 25(a) shows the configuration in a closed ("joined") relationship, with second piece 134.2 held against first piece 134.1 of shell cylinder 134. Lever 138 is in its upward, closed position, which situates wire 136 underneath second piece 134.2 to hold the connector together. FIG. 25(b) illustrates the beginning of the quick release, with the movement of lever 138 downward. The movement of lever 138 in turn allows for wire 136 to come away from second piece 134.2 of shell cylinder 134. FIG. 25(c) shows a further separation between first piece 134.1 and second piece 134.2, with lever 138 continuing to move downward.

Figure 26:
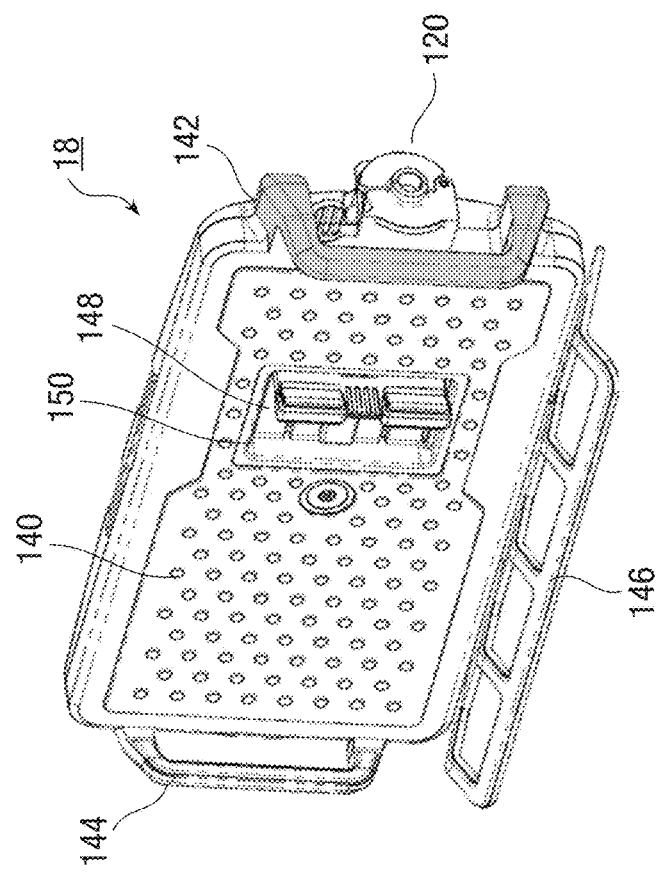
FIG. 26 is an isometric view of an exemplary device holder component which may be included as part of the support fixture of the present invention, the view of FIG. 26 showing an included divider tab in a non-used (closed) position.
Figure 27:
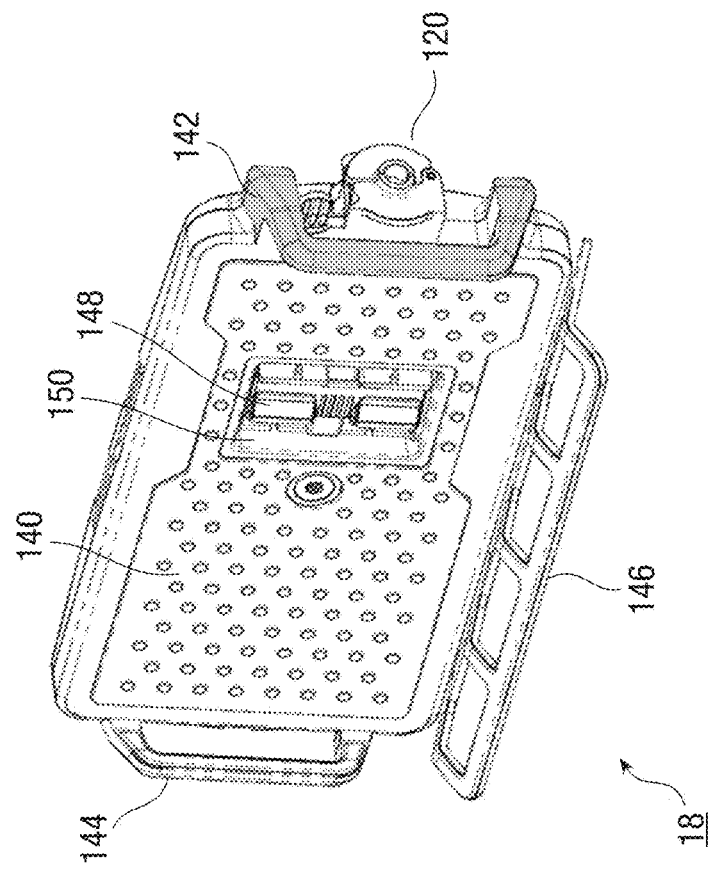
FIG. 27 contains the same isometric view as FIG. 26, in this case where the divider tab is folded up to allow for the support of multiple devices.

FIGS. 26 and 27 are isometric views of device holder component 18, particularly illustrating inventive features that are used to ensure that one or more electronic devices may be supported in a secure manner on fixture 10. Device holder component 18 is shown as comprising a deck surface 140, which may be of a rubberized material and/or include a textured surface that enables device(s) to stay in place. Also included in component 18 is a pair of gripper arms 142, 144 that are used to secure device(s) in place against deck surface 140. In contrast to prior art configurations, gripper arms 142, 144 are located to engage with side surfaces of an electronic device. In this case of supporting an object, for example a laptop computer, gripper arms 142, 144 will be positioned against opposite side terminations of the laptop display. Again, when used with a laptop computer (for example), an angled support bracket 146 may be used to support the keyboard portion of the laptop. In the illustrations shown in FIGS. 26 and 27, gripper arm 142 is defined as a fixed gripper arm which remains motionless in position with deck 140. Fixed gripper arm 142 is preferably positioned at a near-end termination of deck 140, which is in the vicinity of quick release mechanism 120, as shown. In order to aid in the understanding of the inventive features of deck holder component 18, fixed gripper arm 142 is shaded to be darker than opposing gripper arm 144.

Figure 28:
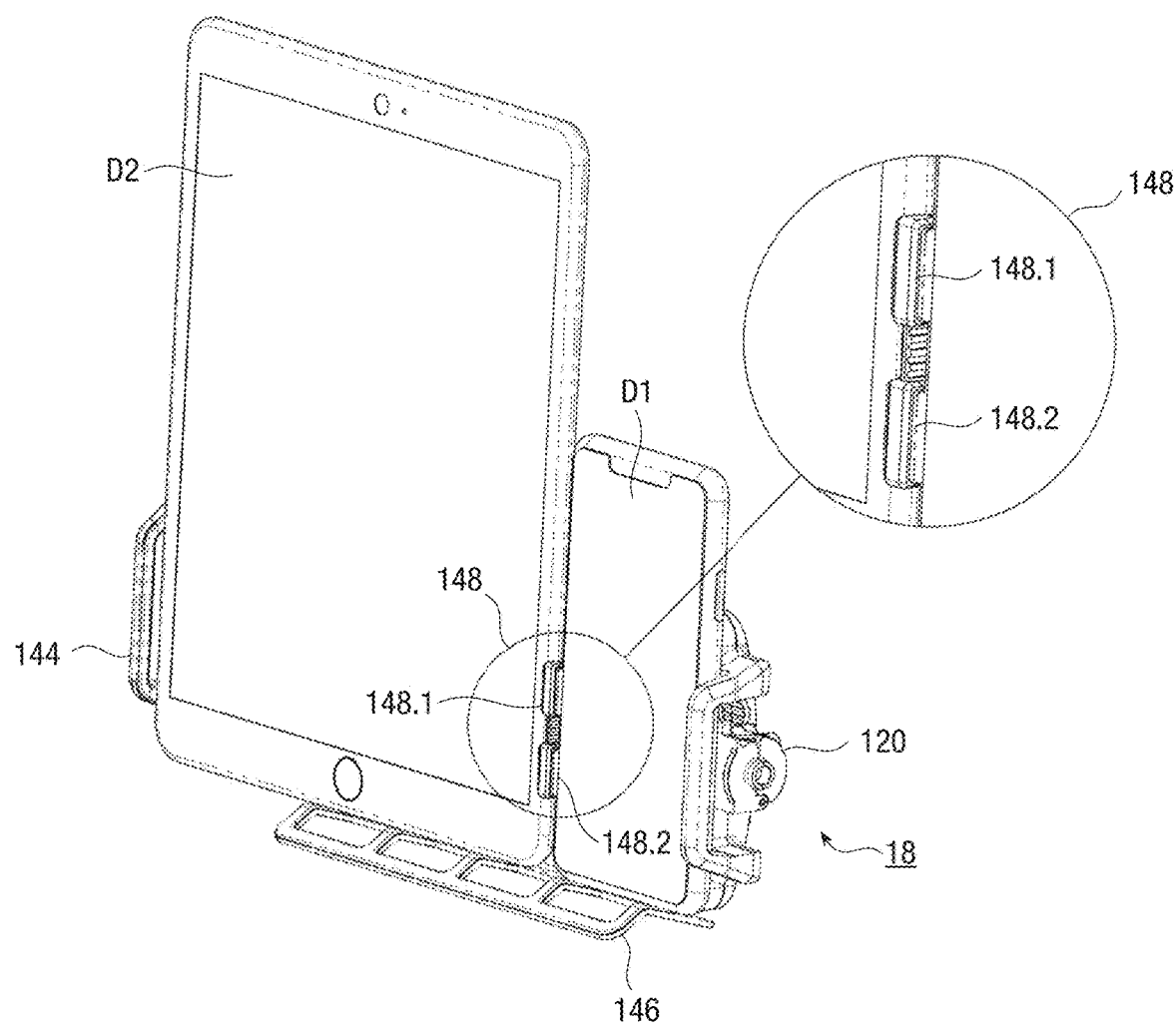
FIG. 28 is a view, related to the depiction of FIG. 27, showing the support of a pair of devices.

As mentioned above, an inventive feature of device holder component 18 is the inclusion of a movable, fold-up divider tab 148 within a recessed cavity formed in deck surface 140. Divider tab 148 is used in the manner discussed below as a type of internal "gripper", allowing for adjacent electronic devices to be positioned on deck surface 140. FIG. 26 shows the configuration when divider tab 148 is not in use and folded down so as to be positioned within recess 150 below the profile of deck surface 140. FIG. 27 shows the configuration when divider tab 148 is folded up so as to be parallel with gripper arms 142, 144. In this position, a first electronic device may be placed between gripper arm 142 and divider 148, and a second electronic device between divider 148 and gripper arm 144. FIG. 28 illustrates an exemplary use of device holder component 18 to securely support two separate devices D1 and D2 by using divider tab 148 between gripper arms 142 and 144. In this particular embodiment, divider tab 148 comprises a pair of separate tab elements 148.1 and 148.2.

Figure 29:
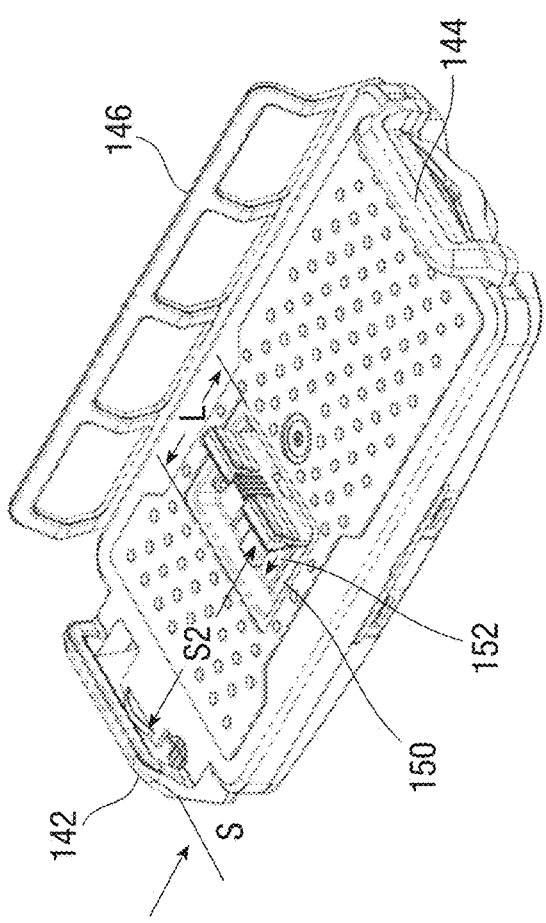
FIG. 29 is a view of the device holder component, with a divider tab in a first position within a recess formed in the device support component.
Figure 30:
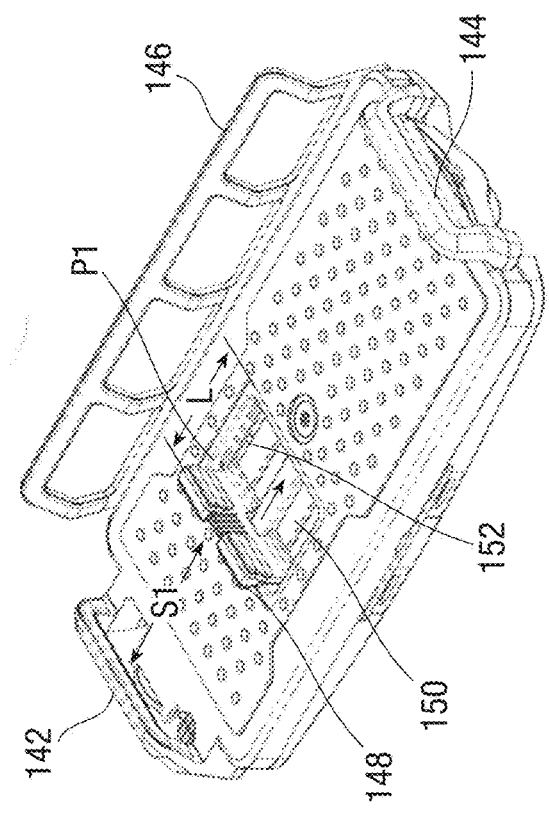
FIG. 30 is a similar view as FIG. 29, with the divider tab moved into a different position within the recess.

Another inventive feature of the arrangement of device holder component 18 is the capability of adjusting the position of divider tab 148 along the extent of deck surface 140, particularly adjusted by moving back and forth along the length L of recess 150. This feature is particularly shown in FIGS. 29 and 30, which illustrate the capability of moving divider tab along a movement slot 152 within recess 150. In this orientation, fixed gripper arm 142 is shown in the left-hand portions of FIGS. 29 and 30, with angled bracket 146 extending upward from deck 140. FIG. 29 shows fold-up divider tab 148 in position at the edge of recess 150 that is closest to fixed gripper arm 142. In order to adjust the position of fold-up divider tab 148, it is moved along the length L of recess 150, particularly by moving along rail slot. FIG. 30 shows fold-up divider tab in a different position, in this case along the opposing side edge of recess 150 so as to be closer to gripper arm 144 than in the configuration shown in FIG. 29. Said another way, the use of a moveable fold-up tab 148 results in the ability to adjust the spacing between S1 in FIGS. 29 and S2 in FIG. 30.

Figure 31:
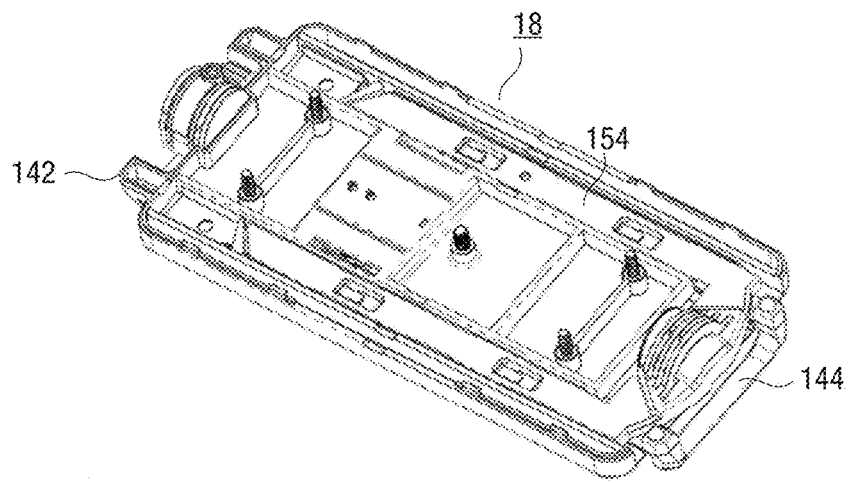
FIG. 31 is a view from the underside of an exemplary device support component.
Figure 32:
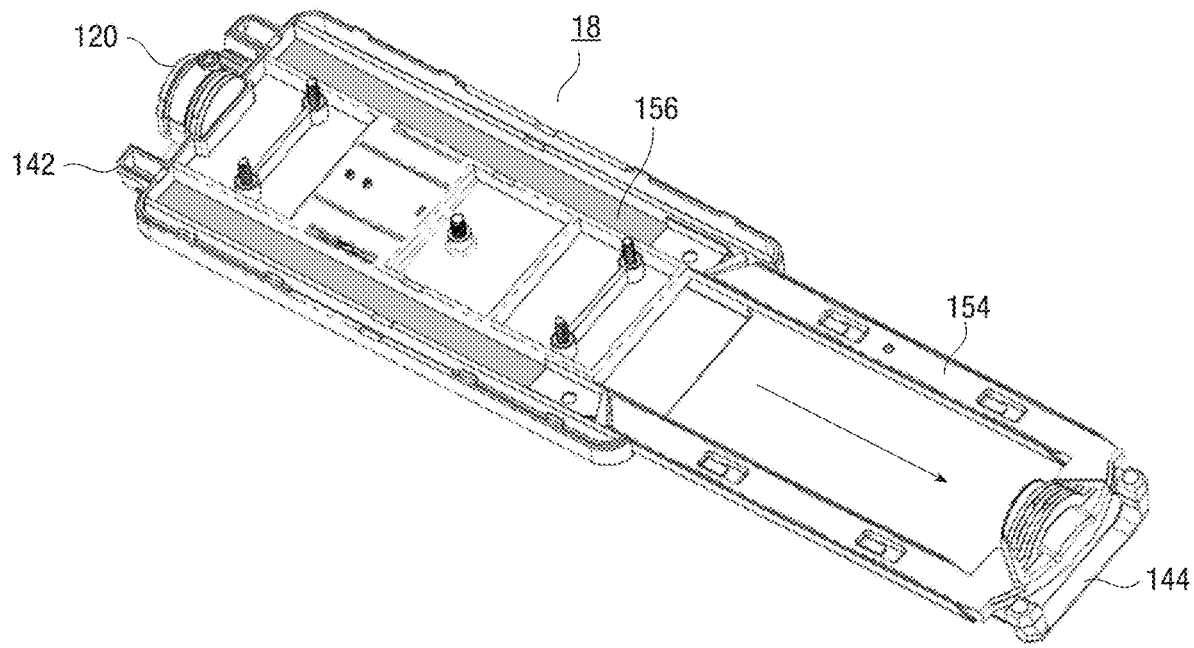
FIG. 32 is another underside view, similar to FIG. 31, in this case illustrating the movement of an extender bracket to support a larger device.

It is to be recalled that gripper arm 142 has been defined as a "fixed" element, which remains motionless with respect to device support component 18. Advantageously, opposing gripper arm 144 may be mounted on an extender bracket that slides within deck 140. FIG. 31 is a view of the underside of an exemplary device support component 18, showing a portion of fixed gripper arm 142 as well as a movable gripper arm 144. An extender bracket 154 is shown as included along the underside of deck 140, sliding along a channel 156 formed along the longitudinal sides of deck 140. Movable gripper arm 144 is shown as connected to the end termination of extender bracket 154. The arrangement of FIG. 31 shows bracket 154 in the closed position, with gripper arm 144 located against the side of deck 140. FIG. 32 illustrates the movement of extender bracket 154, allowing for movable gripper arm 144 to be moved away from deck 140. Advantageously, the ability to move gripper arm 144 allows for device holder component 18 to be reconfigured as necessary to support devices of different sizes.

Figure 33:
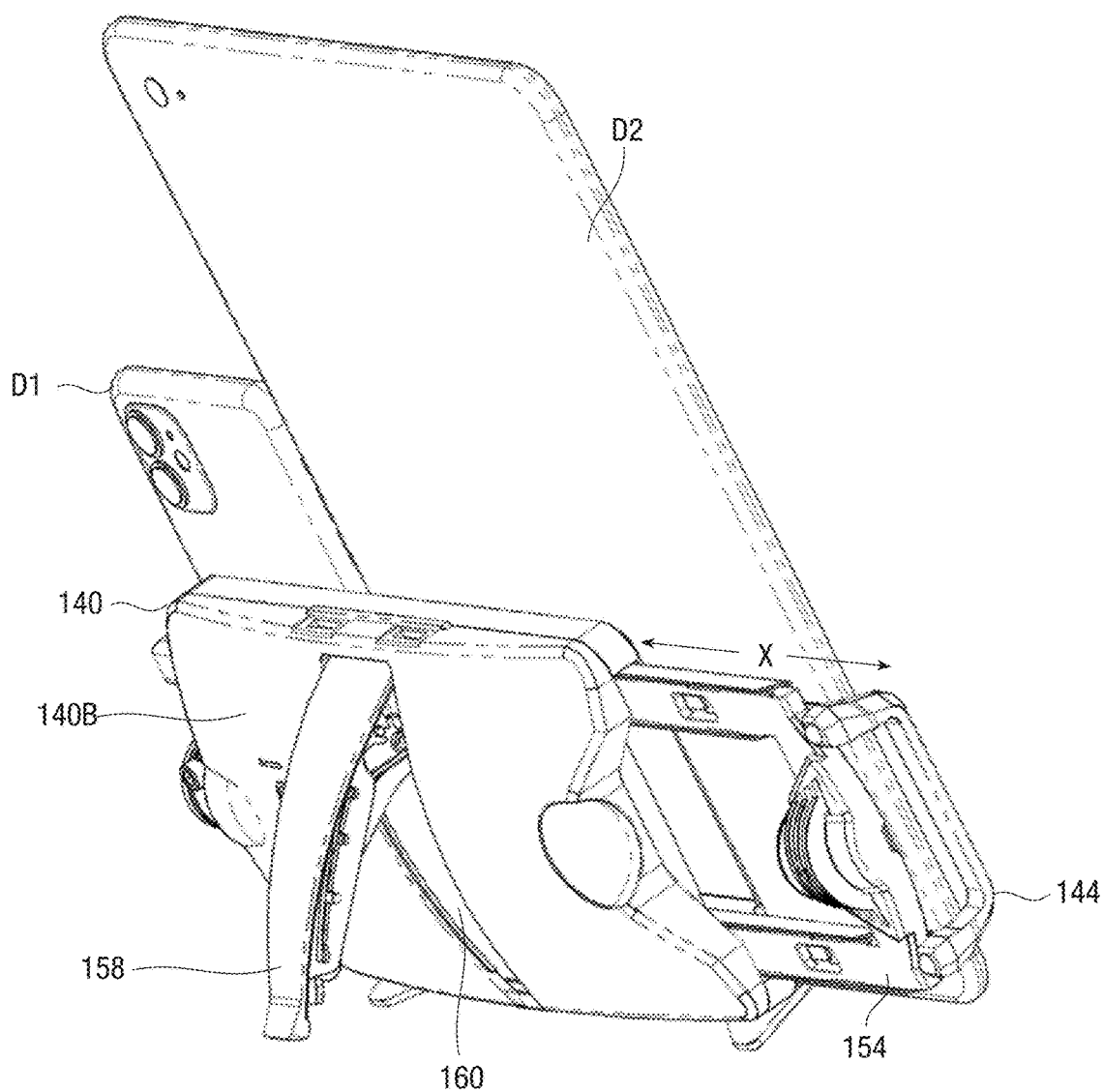
FIG. 33 is a rear view of the configuration of FIG. 28.

FIG. 33 is a rear view of the configuration of FIG. 28, which best illustrates the adjustment in position of gripper arm 144 to support both devices D1 and D2. In particular, movable gripper arm 144 is shown as extended a distance X beyond the termination of body 140. Also shown in this view is a swing-out back leg 158 that may be used to provide further support for the set of electronic devices positioned on device support component 18 when used independently of the remaining components of the arm assembly. In a preferred embodiment, swing-out back leg 158 is hinged along a back surface 140B of deck 140, and can be re-positioned to become flush with back surface 140B by moving into a recess 160 formed within body 140.

Figure 34:
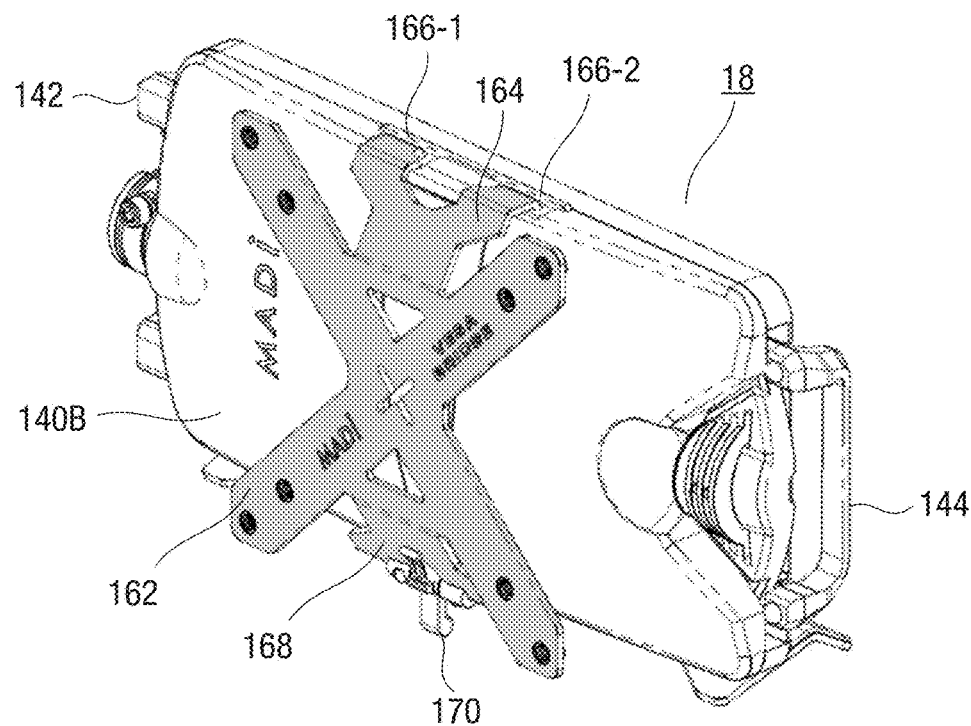
FIG. 34 is a rear view of another embodiment of a device support component, in this case configured to include a mounting fixture.
Figure 35:
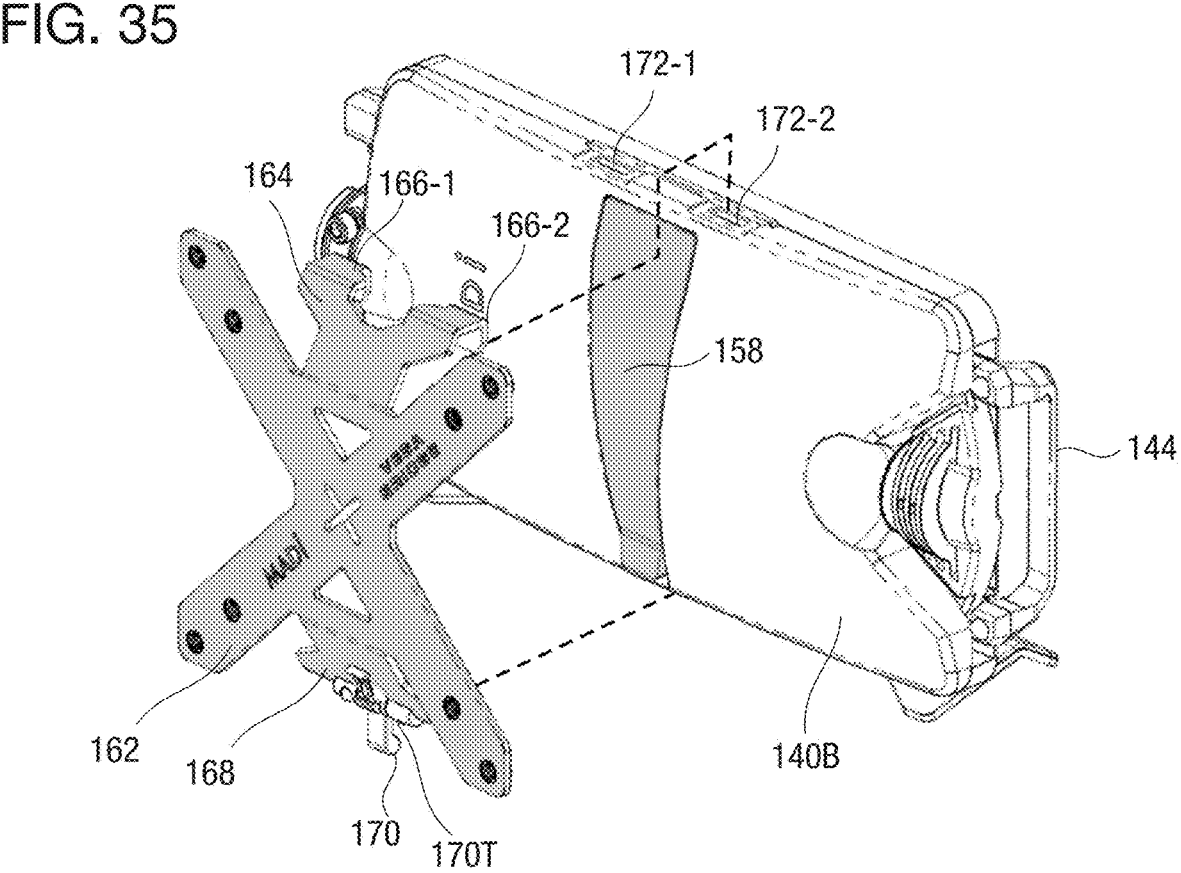
FIG. 35 is an exploded view of the configuration of FIG. 34.

FIG. 34 is also a review of device support component 18, in this case further configured to include a mounting fixture 162 that is typically used with various well-known configurations of mounting arms (i.e., desk-mounted monitor arm arrangements, mounting arms extending from walls, and the like). A clipping member 164 is formed as part of mounting fixture 162 and in this arrangement includes a pair of flanges 166-1, 166-2 for engaging with slots 172-1 and 172-2 formed in proper locations along a side wall of body 140. Further stability in the attachment of mounting fixture 162 with backside 140B of body 140 may be provided by a lower clipping member 168. As shown, lower clipping member 168 includes a flange 170 and associated tab 170-T for engaging with body 140. FIG. 35 is a somewhat exploded view of the arrangement of FIG. 34. Evident in this view is the position of swing-out back leg 158 in its recessed, flush position along body backside 140B. Clipping members 164 and 168 are clearly shown in this view, as are a pair of slots 172-1, 172-2 formed on body 140 for engaging with flanges 166-1, 166-2 of fixture 162.

It will be appreciated by those skilled in the art that changes may be made to the above-described embodiments without departing from the broad inventive concepts as defined by the following claims. It is understood, therefore, that this invention is not limited to the particular disclosed embodiments, but it is intended to cover modifications within the spirit and scope of the disclosure. Moreover, aspects and features of various embodiments may be combined in a particular device; and fewer than all aspects and features of a particular embodiment disclosed herein may be sufficient for a functional embodiment.

What is claimed is:

1. A device holder component for use in supporting at least one communication device, comprising:
   a main body deck;
   a pair of side grippers disposed along opposite terminations of the main body deck and used for securing side edges of the at least one communication device to the device holder component; and
   at least one fold-up tab included within the body to be rotated between a recessed location within the body and a raised location parallel to the pair of side grippers, wherein at least one fold-up tab is moveable along a portion of the body.

2. The device holder component as defined in claim 1 wherein the pair of side grippers comprises a stationary gripping arm and a slidable gripping arm for providing adjustment of a spacing between the pair of side grippers.

3. The device holder as defined in claim 1 wherein the main body deck includes a textured top surface for securing a position of the supported at least one communication device.

4. The device holder component as defined in claim 1, further comprising
   a movement slot disposed within the recessed location and positioned to extend in a lateral direction across the body, where the at least one fold-up tab is coupled to the movement slot for providing adjustments in fold-up tab position along the portion of the body.

5. The device holder component as defined in claim 1, wherein at least one fold-up tab includes grip surfaces on both sides thereof.

6. The device holder component as defined in claim 1, further comprising
   an angled support bracket attached to a lower surface of the main body deck between the pair of side grippers and positioned such that at least one communication device may be disposed on the angled support bracket.

7. A device holder component for use in supporting at least one communication device, comprising:
   a main body deck;
   a pair of side grippers disposed along opposite terminations of the main body deck and used for securing side edges of the at least one communication device to the device holder component; and
   an adapter plate removably coupled to a back surface of the main body deck, the adapter plate for attachment to standard monitor attachments.

8. The device holder component as defined in claim 7, wherein the adapter plate further comprises a mounting fixture for removably coupling the adapter plate to the back surface of the main body deck.

9. The device holder component as defined in claim 8 wherein
   the main body deck includes attachment slots located along top and bottom surfaces, orthogonal to the pair of side grippers; and
   the mounting fixture includes flanged clipping members for engaging with the attachment slots and supporting the adapter plate in a removably coupled configuration.

10. The device holder component as defined in claim 7, further comprising
    an angled support bracket attached to a lower surface of the main body deck between the pair of side grippers and positioned such that at least one communication device may be disposed on the angled support bracket.

11. The device holder as defined in claim 7 wherein the main body deck includes a textured top surface for securing a position of the supported at least one communication device.

12. The device holder component as defined in claim 7 wherein the pair of side grippers comprises a stationary gripping arm and a slidable gripping arm for providing adjustment of a spacing between the pair of side grippers.

13. A device holder component for use in supporting at least one communication device, comprising:
    a main body deck;
    a pair of side grippers disposed along opposite terminations of the main body deck and used for securing side edges of the at least one communication device to the device holder component; and
    a hinged arm stand attached to a back surface of the main body deck, the hinged arm providing further support for an attached device.

14. The device holder component as defined in claim 13, wherein the main body deck further includes a recess formed within the back surface to support the hinged arm in a flush position with respect to the back surface when not in use.

15. The device holder component as defined in claim 13, further comprising
    an angled support bracket attached to a lower surface of the main body deck between the pair of side grippers and positioned such that at least one communication device may be disposed on the angled support bracket.

16. The device holder as defined in claim 13 wherein the main body deck includes a textured top surface for securing a position of the supported at least one communication device.

17. The device holder component as defined in claim 13 wherein the pair of side grippers comprises a stationary gripping arm and a slidable gripping arm for providing adjustment of a spacing between the pair of side grippers.

* * * * *